United States Patent
Terao

(10) Patent No.: US 7,148,982 B2
(45) Date of Patent: Dec. 12, 2006

(54) GATEWAY UNIT, CONTROL METHOD THEREOF, AND COMMUNICATION SYSTEM

(75) Inventor: Yuichi Terao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 964 days.

(21) Appl. No.: 10/033,469

(22) Filed: Dec. 27, 2001

(65) Prior Publication Data

US 2002/0101621 A1 Aug. 1, 2002

(30) Foreign Application Priority Data

Dec. 28, 2000 (JP) .............................. 2000-402494

(51) Int. Cl.
*G06F 15/00* (2006.01)
*G06F 15/16* (2006.01)
*H04N 1/00* (2006.01)
*H04L 12/56* (2006.01)

(52) U.S. Cl. ...................... 358/1.15; 358/405; 709/228; 370/401

(58) Field of Classification Search ............... 358/1.15, 358/400, 405, 409, 434–439, 442, 407, 468, 358/402, 406; 709/228; 375/222; 370/401
See application file for complete search history.

(56) References Cited

U.S. PATENT DOCUMENTS

| 5,210,826 | A | * | 5/1993 | Takeda et al. .............. 709/228 |
| 5,357,543 | A | * | 10/1994 | Hinokimoto ................ 375/224 |
| 5,881,064 | A | * | 3/1999 | Lin et al. .................... 370/389 |
| 6,259,538 | B1 | * | 7/2001 | Amit et al. ................. 358/442 |
| 7,002,970 | B1 | * | 2/2006 | Veschi ........................ 370/401 |

FOREIGN PATENT DOCUMENTS

JP 2000-341342 12/2000

* cited by examiner

*Primary Examiner*—Kimberly Williams
*Assistant Examiner*—Charlotte M. Baker
(74) *Attorney, Agent, or Firm*—Cooper & Dunham LLP

(57) ABSTRACT

The present invention provides a gateway unit, a controlling method thereof and a communication system that realize a real-time network facsimile communication in a packet-PSTN network environment at a transmission speed set up between a facsimile apparatus and a partner terminal unit, wherein required network bandwidth corresponding to the transmission speed can be adjusted to be narrower than network bandwidth allocated by a gatekeeper unit.

18 Claims, 13 Drawing Sheets

FIG.4

| TRANSMISSION SPEED | NETWORK DELAY COEFFICIENT | REQUIRED NETWORK BANDWIDTH Bh |
|---|---|---|
| 14.400bps | | 17.280 |
| 9.600bps | | 11.520 |
| 7.200bps | 1.2 | 8.640 |
| 4.800bps | | 5.760 |
| 2.400bps | | 2.880 |

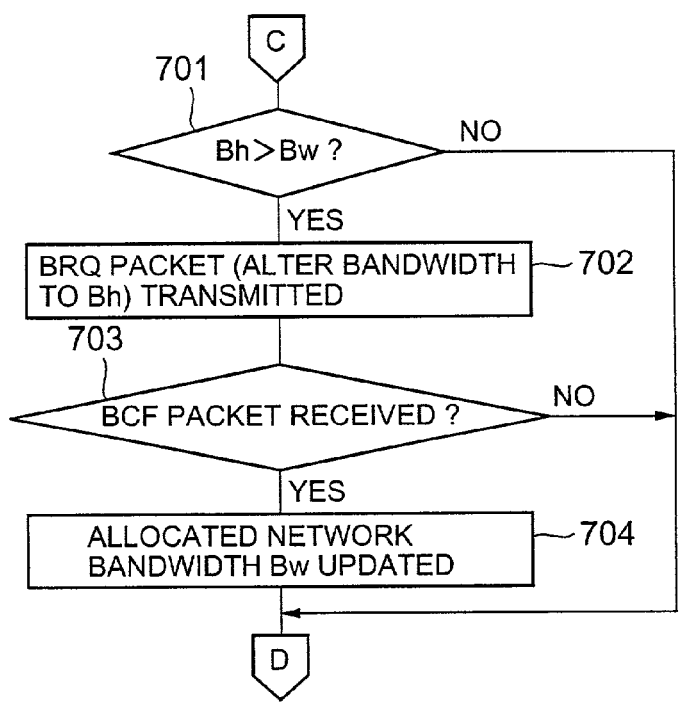
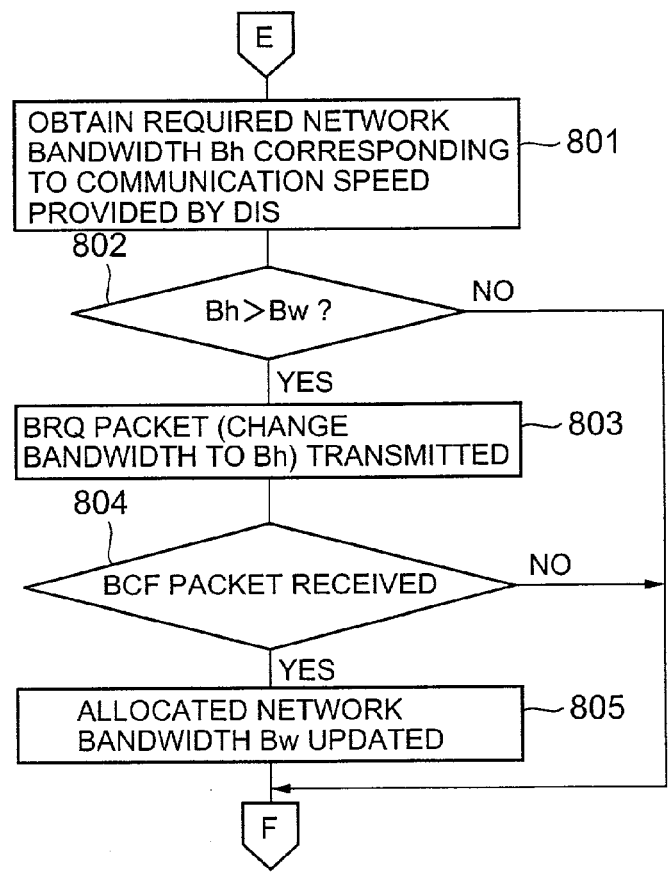

GATEWAY UNIT, CONTROL METHOD THEREOF, AND COMMUNICATION SYSTEM

BACKGROUND OF THE INVENTION

1. Field of the Invention

The present invention relates to a gateway unit, a control method thereof, and a communication system that perform real-time facsimile communication via a PSTN (public switched telephone network) and a packet network.

2. Description of the Related Art

In facsimile communication through a PSTN, specifically G3 (group 3) facsimile communication based on the ITU-T recommendation T.30, for example, a transmitting terminal and a receiving terminal transmits and receives, respectively, a facsimile message while directly exchanging a facsimile control signal. Since it is a real-time communication, a capability exchange between the transmitting terminal and the receiving terminal is possible. Thereby, when a reception error arises at the receiving terminal during communication, the error can be detected by exchanging the facsimile control signal between the transmitting terminal and the receiving terminal. Thus, the transmitting terminal can recognize the reception error as a transmission error by detecting a failure in the exchange of the facsimile control signal. Thereby, an advantage is that checking whether the facsimile message has been correctly transmitted to the receiving terminal is facilitated.

The facsimile communication through the PSTN, however, has a problem in that the communication fee is charged according to transmission time.

On the other hand, in packet networks, such as the Internet and the like, communication by E-mail is widely used. The network communication by E-mail has an advantage in that the communication charge is basically free.

In the network communication by E-mail, a mail server intervenes between the transmitting terminal and the receiving terminal. Therefore, transmission of the E-mail from the transmitting terminal to the mail server and reception of the E-mail from the mail server by the receiving terminal are performed on a non-real-time basis, that is, the two events do not take place continuously one after the other. Thus, the capability exchange between the transmitting terminal and the receiving terminal is impossible. Thus, if a reception error occurs during the reception from the mail server, even if the transmission of the E-mail has already been successfully completed at the transmitting terminal, it cannot be detected by the transmitting terminal.

Therefore, undesirable events have occurred when the receiving terminal was not prepared, for example, for a form (file format, coding form, resolution, and the like) of document data transmitted by the transmitting terminal. That is, although the transmission of the document data from the transmitting terminal was successful, a reception error occurred at the receiving terminal that is incapable of handling the data, resulting in a transmission failure.

Then, ITU-T recommendation T.38 was issued in April 1999, which is for exchanging a packetized facsimile control signal on a packet network. The recommendation provides a communication mode that offers advantages of both the PSTN and the packet network, namely, the capability exchange between the terminals and the real-time communication, being the advantages of the facsimile communication through the PSTN, and the basically free communication charge, being the advantage of the packet network.

By performing a communication based on the T.38 recommendation, a facsimile communication between the terminals, securing the capability exchange and in real-time, can now be performed on the network.

There are two types of network terminals that follow the T.38 recommendation (T.38 terminals), one being an IAF (Internet Aware Fax) that is directly connected to the network, and the other being a GW (Gateway) that performs a real-time transfer to a leased line, a PSTN circuit and the like.

The IAF type terminal is a so-called network facsimile apparatus, which exchanges a T.30 signal that is a packetized facsimile control signal with a partner terminal unit (IAF or GW) on a real-time basis, and serves as a final destination to receive document data from a partner terminal unit.

On the other hand, a GW type terminal enables a real-time communication between a T.38 terminal on the network and a conventional facsimile apparatus, such as a G3 facsimile apparatus, on the PSTN. This is realized by converting a T.30 signal extracted from a packet received from a terminal (IAF or GW) into a modem signal, and transmitting the modem signal to the conventional facsimile apparatus as final destination via the PSTN, and by packetizing a modem signal received from the conventional facsimile apparatus through the PSTN into a T.30 signal, and transmitting to the other terminal via the network.

As described above, a real-time communication between a T.38 terminal on an IP network and a conventional G3 facsimile apparatus on the PSTN is realized by the T.38 compliant GW type terminal converting a T.30 signal received as an IP packet into a modem signal, keeping information content as it is, and transmitting the modem signal to the PSTN, and by converting a T.30 signal received from the PSTN as a modem signal into an IP packet signal, keeping information content as it is, and transmitting the IP packet to the packet network. This means that a transmission speed of the high-speed modem for facsimile message transmission is set up by a T.30-based protocol between the conventional G3 facsimile apparatus connected to the GW type terminal through the PSTN, and an IAF terminal connected to the GW type terminal via the packet network, or another conventional G3 facsimile terminal connected through the PSTN to another GW type terminal that is connected to the packet network.

Specifically, an apparatus on the receiving side provides its capability, including information about a capable transmission speed to an apparatus on the transmitting side by a digital identification signal DIS. The transmitting-side apparatus determines a communication condition within capacity limits of the receiving side apparatus and the transmitting-side apparatus, and the determined communication condition is provided to the receiving side apparatus by a digital transmitting instruction signal DCS so that the same condition as the transmitting-side apparatus is set up in the receiving side apparatus.

Therefore, it has been a prerequisite for the real-time network facsimile communication under the T.38 that network bandwidth allowed to the GW type terminal is sufficient to realize a message data transmission at the transmission speed set up between the terminals by the T.30 protocol.

For above reasons, message data cannot be transmitted and received at the set-up transmission speed if the network bandwidth allowed to the GW type terminal is insufficient for transmission of the message data in the transmission speed set up between the terminals by the T.30 protocol, causing a communication error.

In an office where facsimile is not used frequently, dedicating sufficient network bandwidth (about 64 Kbps) to a GW type terminal for facsimile communications reduces bandwidth for other applications, creating inefficiency. Especially, in a packet network using an ISDN router and the like, available bandwidth is narrow, such as 64 and 128 Kbps, making it difficult to dedicate sufficient bandwidth for the facsimile communication.

These problems arise not only in the ITU-T T.38 compliant facsimile communications, but also in real-time network facsimile communications realized by conversion between a T.30 packetized signal on the packet network and a T.30 signal on the PSTN.

SUMMARY OF THE INVENTION

It is a general object of the present invention to provide a gateway unit, a controlling method thereof and a communication system that substantially obviate one or more of the problems caused by the limitations and disadvantages of the related art previously described.

The gateway unit, the controlling method thereof and the communication system realize a real-time network facsimile communication at a speed set up between a facsimile apparatus and a partner terminal apparatus, and the object is achieved by controlling bandwidth required of a packet network to be narrower than an allocated network bandwidth.

The required bandwidth at which the facsimile communication is to be performed is controlled to become equal to or narrower than the allocated network bandwidth allowed by a gatekeeper unit.

This is realized through a number of ways, including requiring a predetermined bandwidth that is narrower than the allocated network bandwidth, making a second request for a wider bandwidth when the allocated bandwidth was narrower than the required bandwidth, and adjusting the required bandwidth to become narrower than the allocated bandwidth by communicating a modem training failure and the like.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a gateway unit, a controlling method thereof, and a communication system particularly pointed out in the specification in such full, clear, concise, and exact terms as to enable a person having ordinary skill in the art to practice the invention.

BRIEF DESCRIPTION OF THE DRAWINGS

FIG. 4 is a table showing required network bandwidth corresponding to each transmission speed through a PSTN;

FIG. 15 is a flowchart showing the process concerning a fourth embodiment of the gateway unit the present invention; and FIG. 16 is a flowchart showing the process concerning a fifth embodiment of the gateway unit of the present invention.

DESCRIPTION OF THE PREFERRED EMBODIMENTS

In the following, embodiments of the present invention will be described with reference to the accompanying drawings.

Further, the present invention is not limited to these embodiments, but various variations and modifications may be made without departing from the scope of the present invention.

In the following, preferred embodiments will be described generally along with the present invention being applied to a real-time network facsimile communication performed by an ITU-T T.38 compliant gateway unit that is situated between an ITU-T T.30 compliant G3 facsimile apparatus on a PSTN, and an ITU-T T.38 compliant partner terminal unit (a gateway unit or a network facsimile apparatus) on a packet network. However, it should be noted that when a new apparatus, such as a G4 facsimile apparatus, becomes available in addition to the G3 facsimile apparatus for the real-time network facsimile communication through the gateway unit in the packet network, the present invention can be substantially applied to the new apparatus, such as the G4 facsimile apparatus, without deviating from the meaning of the present invention.

Figure 1:
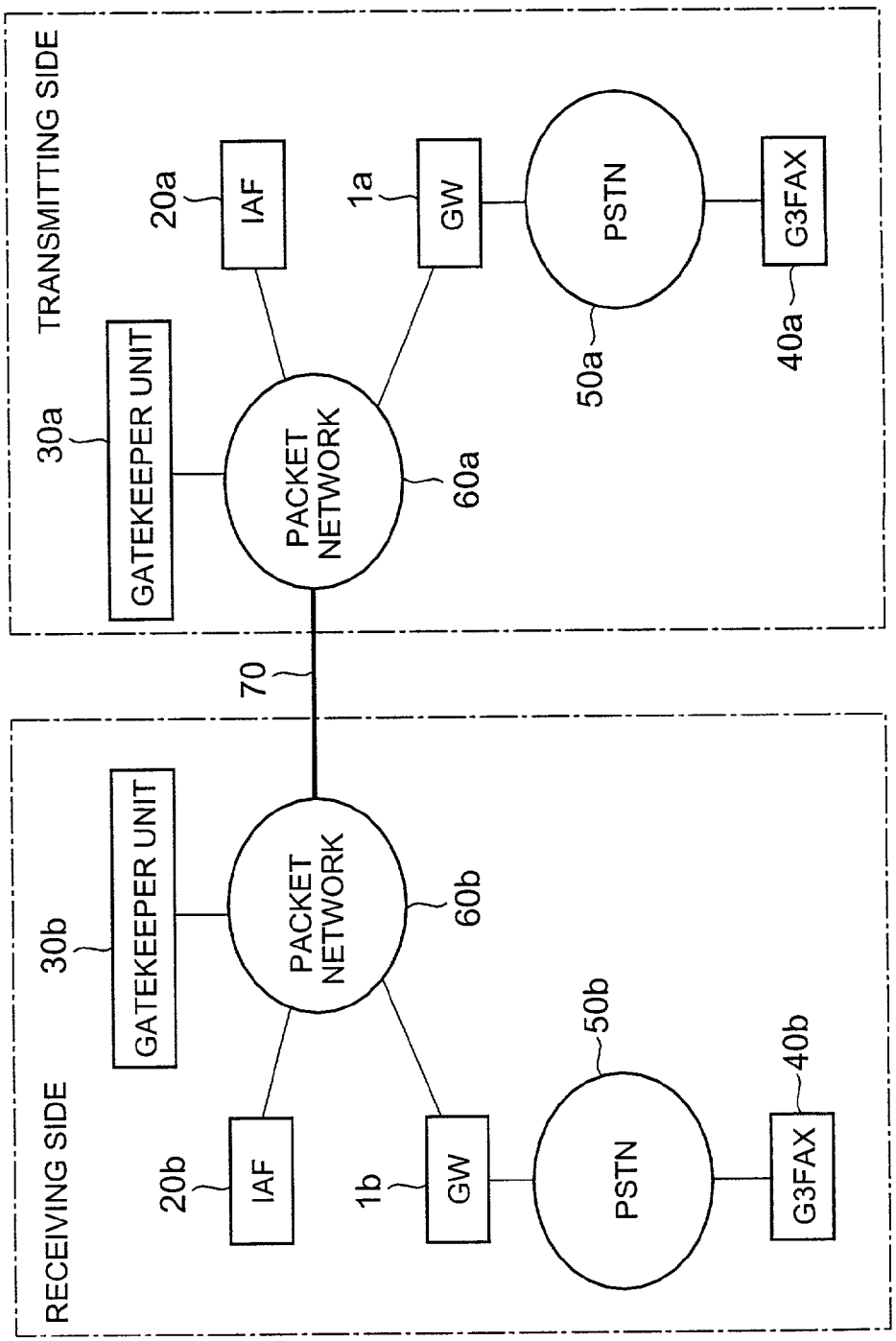
FIG. 1 shows a composition of a real-time network facsimile communication system including a gateway unit, describing a first embodiment of the present invention.

First, FIG. 1 shows an example of a composition of a real-time network facsimile communication system including a gateway unit 1 of the embodiments of the present invention.

The system shown in FIG. 1 includes a receiving-side system on the left-hand side and a transmitting-side system on the right-hand side, the two systems being connected by a communication line 70 having network bandwidth of, for example, 64 Kbps.

A G3 fax 40a which is a G3 facsimile apparatus on the transmission side makes a call, and provides an address specification of a receiving party through a PSTN 50a to a gateway unit (GW) 1a that is a T.38 terminal unit on the transmitting-side.

A network facsimile apparatus (IAF) 20a as a T.38 terminal unit on the transmitting-side directly receives the address specification from its control unit and the like.

Prior to starting communication through a packet network 60a, the GW 1a and the IAF 20a as the T.38 terminal units on the transmitting-side request an allocation of network bandwidth to a gatekeeper unit 30a, and receive the allocation of the network bandwidth from the gatekeeper unit 30a. In the following description of the embodiments, the network bandwidth allocated by the gatekeeper unit 30a or a gatekeeper unit 30b mentioned later will be called the allocated network bandwidth. In addition, the gatekeeper units 30a and 30b are servers that perform an address solution and bandwidth control between T.38 terminals.

In the packet network 60a, the GW 1a and the IAF 20a perform communication at a transmission speed within a limit of the allocated network bandwidth as T.38 terminal units on the transmission-side, and transmit a SETUP packet to a GW 1b and an IAF 20b as T.38 compliant terminal units on the receiving-side through the communication line 70 and a packet network 60b.

On the receiving side, if the SETUP packet is received, the GW 1b and the IAF 20b as the T.38 terminal units on the receiving-side will demand an allocation of network bandwidth to the gatekeeper unit 30b, and will receive the allocation of network bandwidth from the gatekeeper unit 30b, prior to starting communication through the packet network 60b.

In the packet network 60b, the GW 1b and the IAF 20b as the T.38 terminal units on the receiving-side perform communication at the transmission speed within a limit of the allocated network bandwidth, and perform a real-time network facsimile communication with the GW 1a (connected to the G3 fax 40a) and the IAF 20a as the T.38 terminal units on the transmitting-side via the packet network 60b and the communication line 70.

Further, the GW 1b makes a call to a G3 fax 40b on the receiving side connected to a PSTN 50b, upon receiving the SETUP packet from the transmitting side such that the real-time network facsimile communication between the T.38 terminal units on the transmitting-side and the G3 fax 40b is relayed.

As above, the gateway unit 1 of the present invention functions as the GW 1a on the transmitting side, communicating with the receiving-side T.38 terminal units GW 1b and IAF 20b, and relaying a real-time network facsimile communication between the transmitting-side G3 facsimile apparatus 40a and the T.38 terminal units on the receiving side, and functions as the GW 1b on the receiving side, communicating with the transmitting-side T.38 terminal units GW 1a and IAF 20a, and relaying a real-time facsimile communication between the G3 facsimile apparatus 40b on the receiving side and the T.38 terminal units on the transmitting side.

Figure 2:
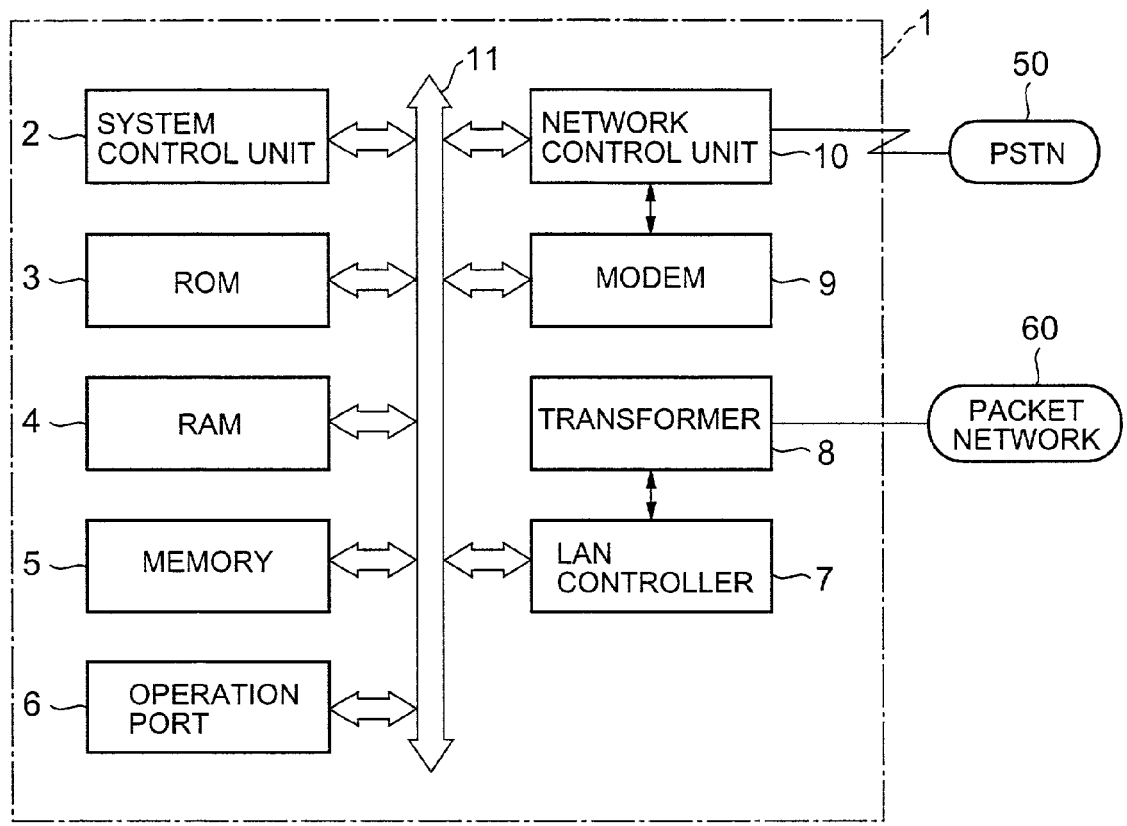
FIG. 2 is a block diagram of the gateway unit concerning embodiments of the present invention.

FIG. 2 shows a block composition of the gateway unit 1 that can serve as the GW unit 1a on the transmitting-side and the GW unit 1b on the receiving-side.

The gateway unit 1 includes a system control unit 2, a ROM3 and a RAM4, a storage 5, an operation port 6, a LAN controller 7, a transformer 8, a modem 9, a network control unit 10, and a system bus 11 as shown in FIG. 2.

The system control unit 2 is a microcomputer to control each part of the gateway unit 1, using the RAM4 as a working area, and according to a control program stored in the ROM3.

The ROM3 is a read-only memory wherein the control program for the system control unit 2 for controlling each part of the gateway unit 1 is stored. The RAM4 is a random access memory used as a working area of the system control unit 2.

The storage 5 stores data and is structured by a hard disk drive unit and the like. The operation port 6 handles a display of an operating status, and accepts various operation inputs to the gateway unit 1.

The LAN controller 10 decodes data received from a packet network 60 through the transformer 8, encodes data to be transmitted to the packet network 60, and buffers a transmitting frame and a receiving frame. In this manner, the LAN controller 10 controls the LAN protocol through the transformer 8 which is a transformer for transmitting and receiving the data to and from the packet network 60 such that a real-time network facsimile communication based on the ITU-T recommendation T.38 is realized by the system control unit 2 controlling a TCP/IP protocol on the LAN protocol.

The modem 9 is a G3 facsimile modem that modulates data to be transmitted to a PSTN 50 through the network control unit 10, and demodulates a signal received from the PSTN 50 through the network control unit 10. Moreover, the modem 9 also sends out a Dial Tone Multi Frequency signal corresponding to a telephone number of a receiving party.

The network control unit 10 is connected to the PSTN 50, performs connection controls such as detecting a polarity reversal of a circuit of the PSTN 50, closing and opening a direct-current loop of the circuit, detecting a circuit release, detecting a dial tone, detecting a busy tone and other tone signals, detecting a ring-back tone and the like, and sends out a dial pulse signal of 10 PPS or 20 PPS according to a dial-up line for the receiving party. The system bus 11 is a signal line for exchanging data among the units described above.

Figure 3:
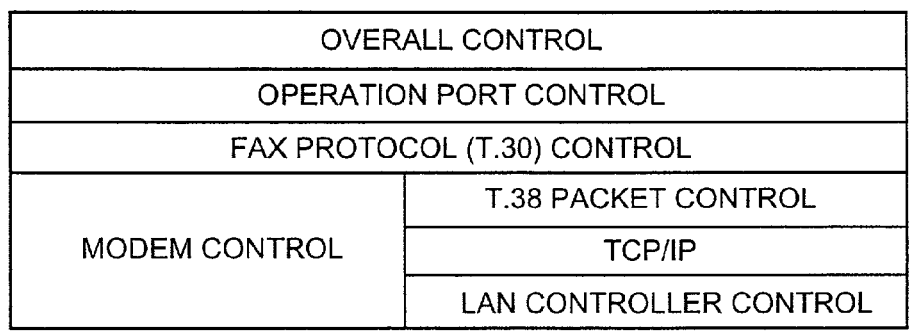
FIG. 3 shows a software composition in the gateway unit concerning embodiments of the present invention.

FIG. 3 shows a software composition of the gateway unit 1.

The gateway unit 1 is a GW type network terminal compliant with the ITU-T recommendation T.38, and is structured such that the G3 facsimile communication based on the ITU-T recommendation T.30 through the PSTN 50 is executed while performing, in parallel, the packet communication function based on the ITU-T recommendation T.38 through the packet network 60.

Accordingly, in the software composition shown in FIG. 3, "Fax protocol (T. 30) control" is positioned in a higher layer than "MODEM control" for a fax data communication on the PSTN, and a protocol stack of "LAN controller control", "TCP/IP" protocol for the network control and "T.38 packet control" for controlling the real-time network facsimile communication. In addition, above the "Fax protocol (T. 30) control", there are "Operation port control" and "Overall control" layers, the latter being for controlling overall operations of the unit.

Next, four process embodiments, called the first, the second, the third and the fourth embodiment, concerning the gateway unit 1 of the present invention will be described. In the following description, required network bandwidth Bh (network bandwidth indispensable to perform G3 facsimile communication at a corresponding transmission speed through the packet network 60) will be referred to. Relationship between the Bh and a transmission speed is shown in FIG. 4. The transmission speed is what can be set up between the two end terminals (between the IAF 20a/G3 fax 40a and the G3 fax 40b, or between the IAF 20b/G3 fax 40b and the G3 fax 40a) in real-time network facsimile communication through the gateway unit 1.

In FIG. 4, the required network bandwidth Bh corresponding to each transmission speed is expressed as a product of the corresponding transmission speed and the network-delay coefficient (1.2 in this case). Here, the network-delay coefficient should be set up in consideration of an overhead of the TCP/IP protocol and the like, and a packet retransmission due to a packet loss and the like. The value of the coefficient may vary depending on packet networks applied, and should be set up appropriately. In addition, an acquisition of the required network bandwidth Bh corresponding to each transmission speed may be performed by storing a table such as shown in FIG. 4 into the storage 5 beforehand to make a reference to the required network bandwidth Bh corresponding to a desired transmission speed, or by storing the network-delay coefficient beforehand into the storage 5 to calculate the transmission speed by multiplication each time. The present invention is not limited by the acquisition method of the required network bandwidth Bh corresponding to a desired transmission speed.

Next, a process of the first embodiment of the gateway unit 1 is described.

The process concerning the first embodiment includes two sets of processes. One is a transmitting-side process that the gateway unit 1 performs as the transmitting-side GW 1a, and the other is a receiving-side process that the gateway unit 1 performs as the receiving-side GW 1b.

The transmitting-side process is first described with reference to FIG. 5. A communication sequence of the real-time network facsimile communication corresponding to the process shown in FIG. 5 is given in FIG. 6.

Figure 5:
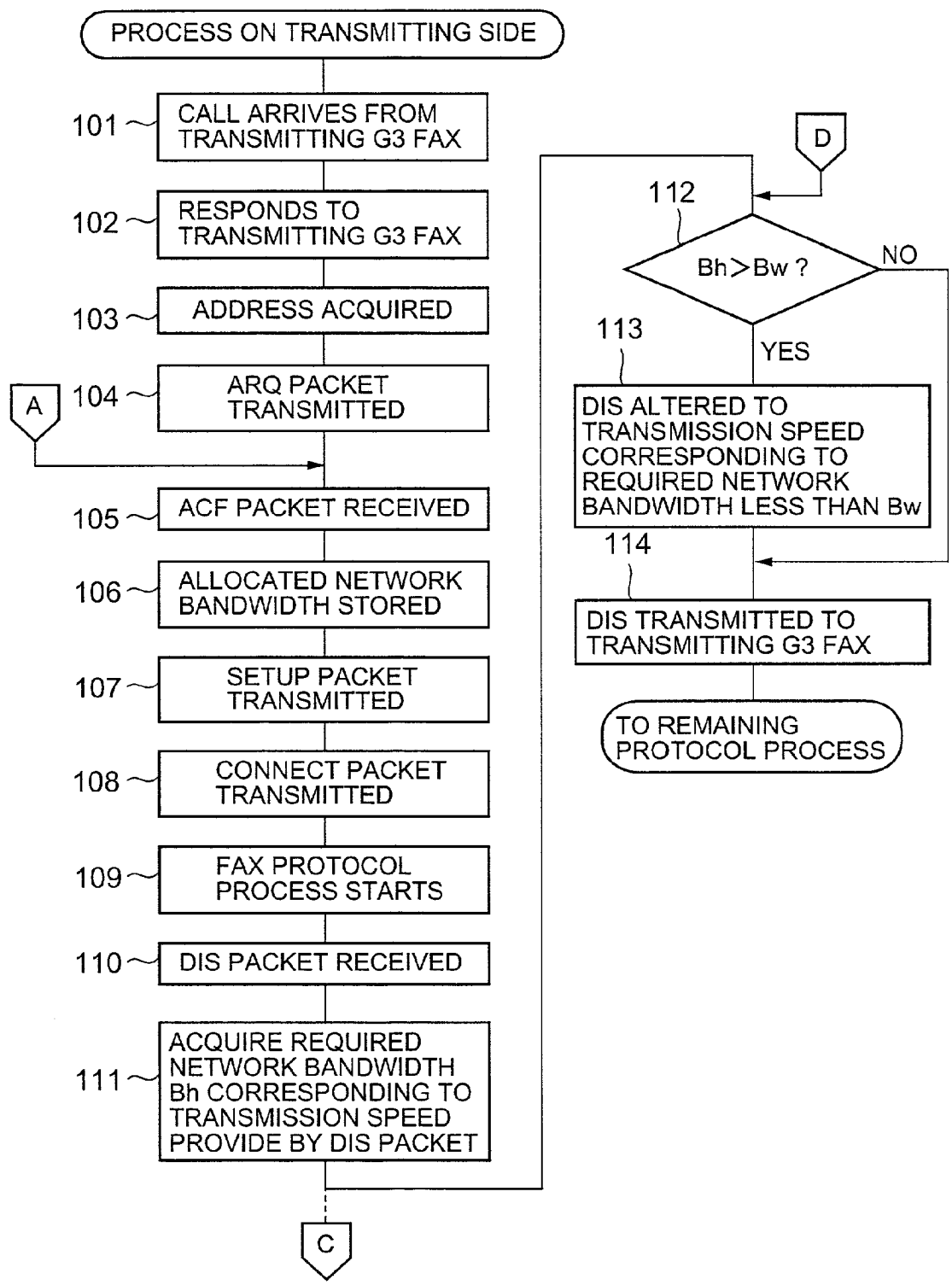
FIG. 5 is a flowchart showing a transmission-side process concerning the first embodiment of the gateway unit of the present invention.
Figure 6:
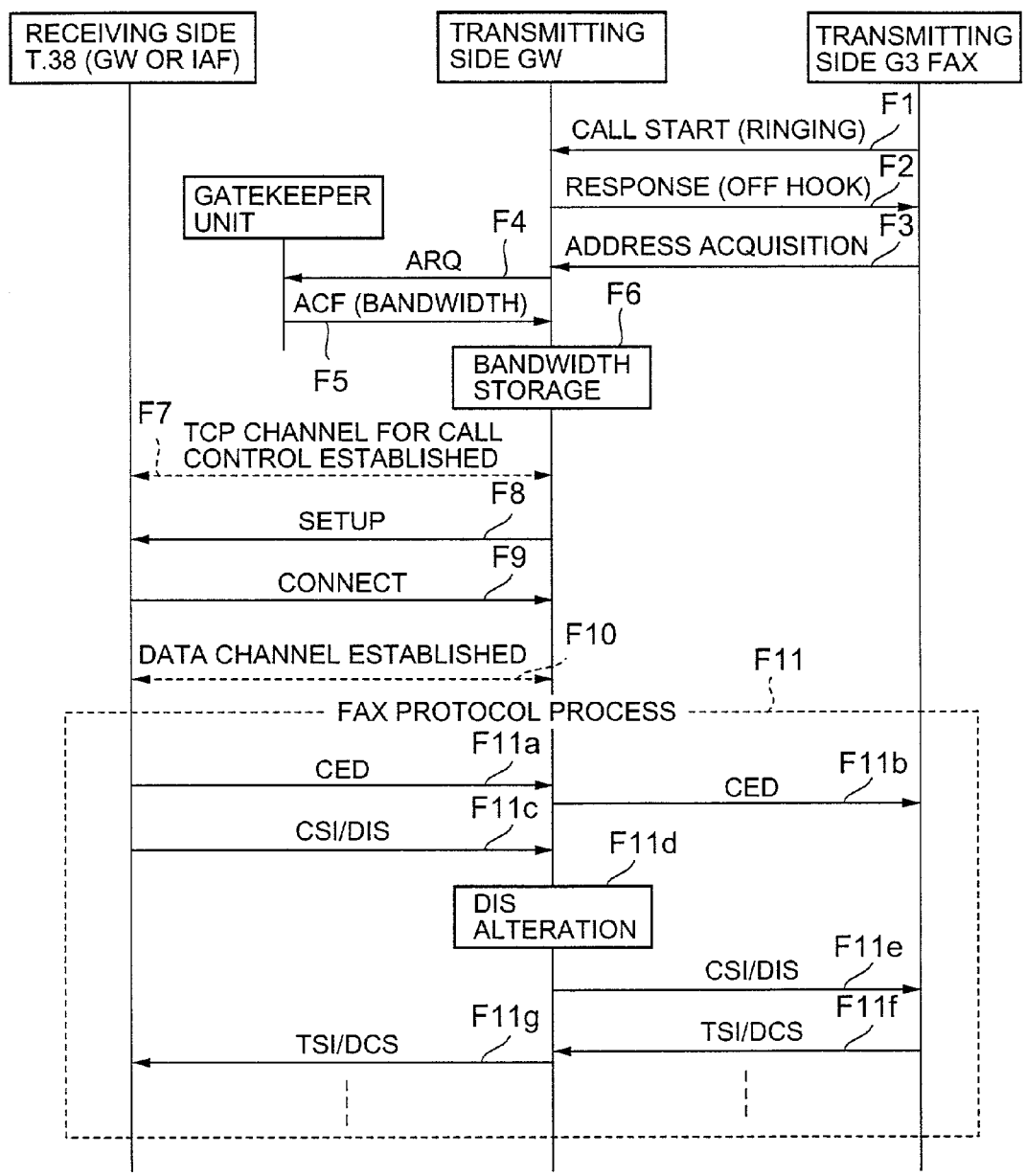
FIG. 6 shows a communication sequence corresponding to the process shown in FIG. 5.

In FIG. 5, the transmitting-side GW 1a receives a call from the PSTN 50a generated by the transmitting-side G3 fax 40a (step 101) as shown in a phase F1 of FIG. 6, and issues a response (step 102) shown in a phase F2 of FIG. 6 to the call.

Then, address information (an IP address (and a fax number)) of a receiving party is acquired (step 103) by a phase F3 of FIG. 6.

Prior to starting the communication, a communication start demand packet (ARQ) is transmitted to the gatekeeper unit 30a (step 104: phase F4 of FIG. 6). A communication start approving packet (ACF) is transmitted from the gatekeeper unit 30a in response to the ARQ packet, and received (step 105: phase F5 of FIG. 6). Network bandwidth information included in the ACF packet is stored into the storage 5 as an allocated network bandwidth Bw (step 106: phase F6 of FIG. 6). Then, the communication through the packet network 60a will start.

Thereby, the communication of the transmitting-side GW 1a through the packet network 60a has to be and is performed within the limit of the allocated network bandwidth Bw.

After a TCP channel is established for a call control (phase F7 of FIG. 6), the transmitting-side GW 1a transmits a SETUP packet to the receiving-side T.38 terminal unit (IAF 20b or GW 1b) (step 107: phase F8 of FIG. 6). If a CONNECT packet is received from the receiving-side T.38 terminal unit (step 108: phase F9 of FIG. 6), a data channel will be established (phase F10 of FIG. 6), and fax protocol process of the phase F11 of FIG. 6 will be started henceforth (step 109).

Then, during the fax protocol processing of the phase F11 started by the step 109, a packet of the digital identification signal DIS is received (step 110: phase F11c of FIG. 6). The fax protocol process of the phase F11 includes receiving a T.30 packet signal as a facsimile control signal that includes a called station recognition signal CED, a called terminal recognition signal CSI and a digital identification signal DIS received through the packet network 60a, converting the signals into modem signals, and performing a transmission process through the PSTN 50a, and their respective reverse processes.

Then, the required network bandwidth Bh that corresponds to the transmission-speed capability of the IAF 20b or the G3 fax 40b connected to the GW 1b as provided by a combination of bits 11, 12, 13, and 14 of contents of FIF (facsimile information field) of the digital identification signal DIS received from the receiving side, is acquired by referring to the table as shown in FIG. 4, or by multiplying the network-delay coefficient (step 111).

Here, the process of the transmitting-side GW 1a shown in FIG. 5 is applicable to a case where the receiving-side GW 1b is a standard gateway unit in compliance with the T.38 that simply converts the digital identification signal DIS of the modem signal received from the receiving-side G3 fax 40b into a packet without alteration, and transmits the packet. However, it is emphasized that this process is also applicable to a case where the receiving-side GW 1b is concerned with the first embodiment, wherein the digital identification signal DIS to be received in the step 110 may have been altered by a process on the receiving side as will be described in reference to FIG. 7.

Next, whether the required network bandwidth Bh acquired by the step 111 is wider than the allocated network bandwidth Bw currently stored by the step 106 is checked (checking step 112).

When the required network bandwidth Bh is narrower than the allocated network bandwidth Bw ("No" at the checking step 112), a bandwidth overflow will not occur in the packet network 60a at the time of transmission of facsimile message data, even if the highest of the transmission-speed capability provided by the digital identification signal DIS was chosen by the digital transmitting instruction signal DCS of the transmitting-side G3 fax 40a in the phase F11f in FIG. 6. Therefore, the digital identification signal DIS received as a packet by the step 110 is transmitted to the transmitting-side G3 fax 40a as it is, without altering the contents (step 114: phase F11e of FIG. 6), and the fax protocol process of the phase F11 is continued henceforth.

If the required network bandwidth Bh is wider than the allocated network bandwidth Bw ("Yes" at the checking step 112), there is a possibility of a communication error occurring in the transmission of facsimile message data. This is due to the facsimile transmission being performed with the required network bandwidth Bh that is wider than the allocated network bandwidth Bw, when the transmitting-side G3 fax 40a is equipped with a transmission-speed capability beyond the transmission-speed capability of the T.38 terminal on the receiving-side, causing a bandwidth overflow in the packet network 60a unless an adjustment is made. Therefore, the transmission-speed capability (indicated by the bit numbers 11 through 14 in the FIF of the DIS received in the step 110) shall be altered to a lower transmission speed capability (7,200 bps, for example, represented by "1101") which corresponds to required network bandwidth (8,640 bps) lower than the allocated network bandwidth (9,000 bps, for example), (step 113: the phase F11d of FIG. 6). The digital identification signal DIS after the above alteration is converted into a modem signal and transmitted to the transmitting-side G3 fax 40a (step 114: phase F11e of FIG. 6), and the fax protocol processing of the phase F11 is continued henceforth.

In this manner, the transmitting-side GW 1a alters the contents of the digital identification signal DIS received from the T.38 terminal on the receiving-side, the same as if the transmission-speed capability of the T.38 terminal on the receiving-side were low, such that a transmission speed that will cause a bandwidth overflow is prevented from being set up by the transmitting-side G3 fax 40a. Thus, normal relaying of real-time network communication is always attained by sometimes not basing the network bandwidth on the bandwidth allocated by the gatekeeper unit 30a.

Next, the receiving-side process concerning the first embodiment of the present invention is described with reference to FIG. 7. Further, the communication sequence of the real-time network facsimile communication corresponding to the process shown in FIG. 7 is given in FIG. 8.

Figure 7:
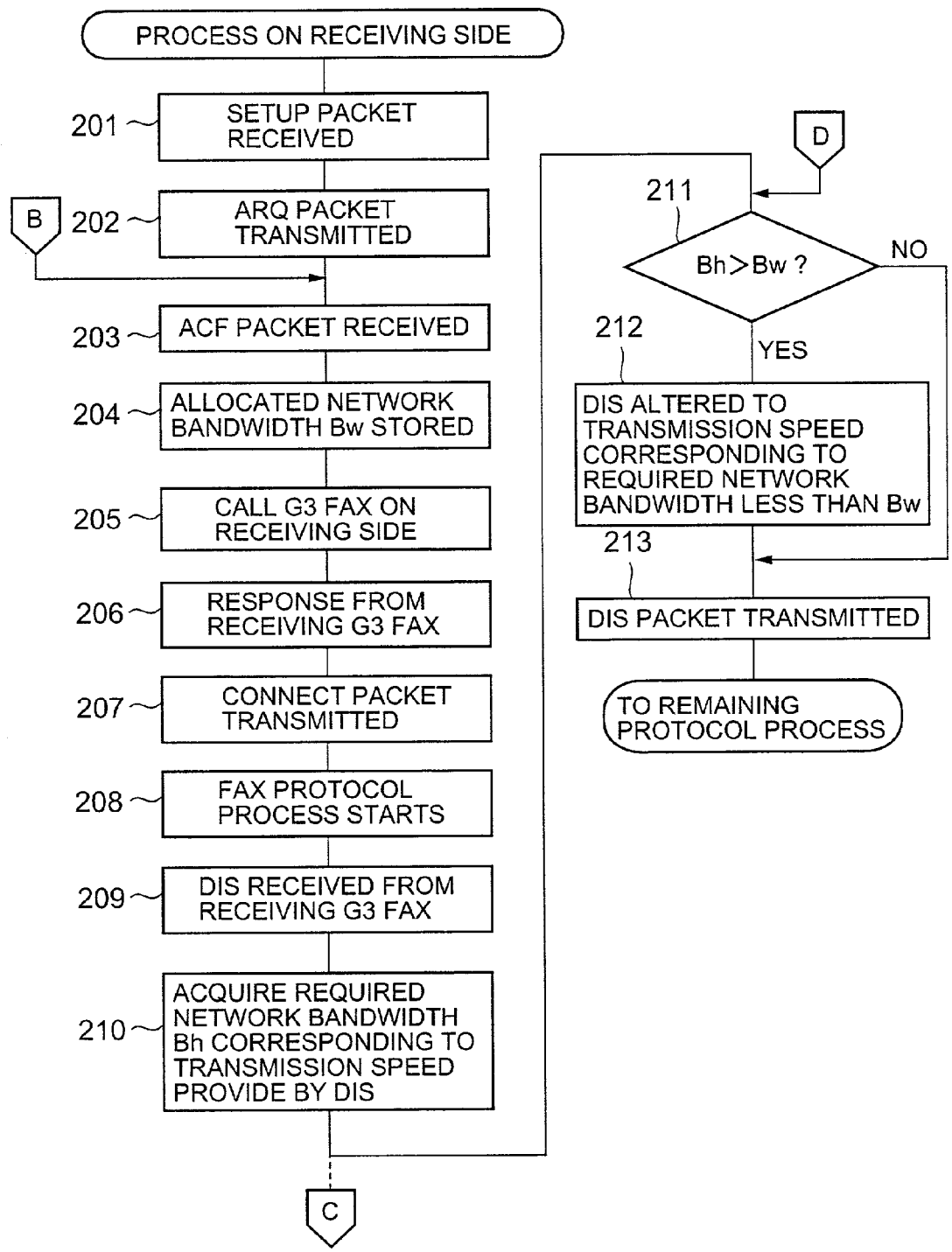
FIG. 7 is a flowchart showings a receiving-side process concerning the first embodiment of the gateway unit of the present invention.
Figure 8:
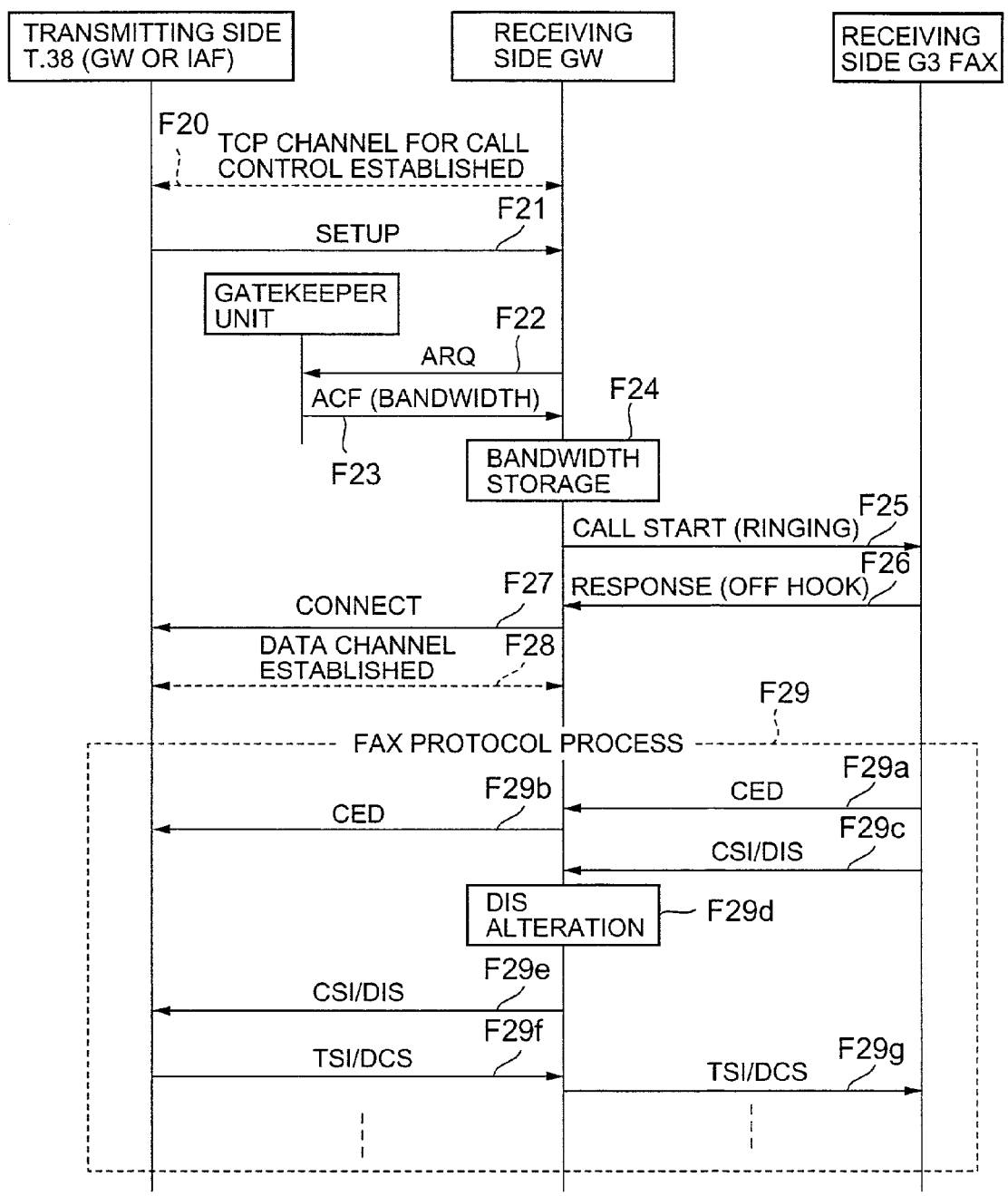
FIG. 8 shows a communication sequence corresponding to the process shown in FIG. 7.

In FIG. 7, the receiving-side GW 1b receives the SETUP packet from the T.38 terminal (the IAF 20a or the GW 1a) on the transmission side (step 201: phase F21 of FIG. 8) after establishment of a TCP channel for a call control (phase F20 of FIG. 8). In addition, an address of the receiving party (fax number) is acquired from the SETUP packet.

In advance of starting the communication, a communication start demanding packet (ARQ) is transmitted to the gatekeeper unit 30b (step 202: phase F22 of FIG. 8). A communication start approving packet (ACF) is transmitted from the gatekeeper unit 30b in response to the ARQ packet, and received (step 203: phase F23 of FIG. 8). The network bandwidth information in the ACF packet is stored into the storage 5 as an allocated network bandwidth Bw (step 204: phase F24 of FIG. 8). Henceforth, the communication through the packet network 60b will take place.

Thereby, communication through the packet network 60b at the receiving-side GW 1b henceforth has to be and is performed within the limit of the allocated network bandwidth Bw.

Then, a call is originated to the receiving-side G3 fax 40b through the PSTN 50b (step 205: phase F25 of FIG. 8), and a response to the originated call is received (step 206: phase F26 of FIG. 8).

When a CONNECT packet is transmitted to the T.38 terminal on the transmitting-side (step 207: phase F27 of FIG. 8), a data channel will be established (phase F28 of FIG. 8), and the fax protocol process of a phase F29 of FIG. 8 will be started henceforth (step 208).

During the fax protocol process of the phase F29 that is started by the step 208, the modem signal of the digital identification signal DIS is received (step 209: phase F29c of FIG. 8). The fax protocol process includes receiving a modem signal of T.30 signals, such as a called station recognition signal CED, a called terminal recognition signal CSI, a digital identification signal DIS, from the PSTN 50b, converting the signals into a packet, and transmitting the packet through the packet network 60b, and their respective reverse processes.

Then, the required network bandwidth Bh that corresponds to the transmission-speed capability of the receiving-side G3 fax 40b as provided by the combination of the bits 11, 12, 13, and 14 of the contents of the FIF (facsimile information field) of the digital identification signal DIS received is acquired, by referring to the table as shown in FIG. 4 or by multiplying the network-delay coefficient (step 210).

Here, the process of the receiving-side GW 1b shown in FIG. 7 is applicable to a case where the transmitting-side GW 1a is a standard gateway unit in compliance with the T.38 that simply converts the digital identification signal DIS of the modem signal received from the transmitting-side G3 fax 40a into a packet without alteration, and transmits the packet. However, it is emphasized that the process is also applicable to a case where the transmitting-side GW 1a is concerned with the first embodiment of the present invention, wherein the digital identification signal DIS to be received in the step 209 may have been altered by a process on the transmitting side as shown FIG. 5.

Next, whether the required network bandwidth Bh acquired by the step 210 is wider than the allocated network bandwidth Bw currently stored by the step 204 is checked (checking step 211).

When the required network bandwidth Bh is narrower than the allocated network bandwidth Bw ("No" at the checking step 211), a bandwidth overflow will not occur in the packet network 60b in transmission of facsimile message data, even if the highest of the transmission-speed capability provided by the digital identification signal DIS was chosen by the digital transmitting instruction signal DCS from the T.38 terminal units, namely, the IAF 20a or the GW 1a (connected with the G3 fax 40a) in the phase F29f in FIG. 8. Therefore, the digital identification signal DIS received as a packet by the step 209 is transmitted to the transmitting-side G3 fax 40a as it is, without altering the contents (step 213: phase F29e of FIG. 8), and the fax protocol process of the phase F29 is continued henceforth.

If the required network bandwidth Bh is wider than the allocated network bandwidth Bw ("Yes" at the checking step 211), there is a possibility of a communication error occurring in the transmission of facsimile message data. This is due to the facsimile transmission being performed with the required network bandwidth Bh that is wider than the allocated network bandwidth Bw, when the transmission-speed capability of the T.38 terminal (that is connected to the transmitting G3 facsimile 40a) on the transmitting-side is beyond the transmission-speed capability of the receiving-side G3 fax 40b, causing a bandwidth overflow in the packet network 60b unless an adjustment is made. Therefore, the transmission-speed capability (indicated by the bit numbers 11 through 14 in the FIF of the DIS received in the step 209) shall be altered to a lower transmission speed capability (7,200 bps, for example, represented by "1101") corresponding to required network bandwidth (8,640 bps) which is narrower than the allocated network bandwidth (9,000 bps, for example), (step 212: the phase F29d of FIG. 8). The digital identification signal DIS after above alteration is converted into a packet signal and transmitted to the transmitting-side T.38 terminal unit (step 213: phase F29e of FIG. 8), and the fax protocol processing of the phase F29 is continued henceforth.

In this manner, the receiving-side GW 1b alters the contents of the digital identification signal DIS received from the G3 facsimile 40b on the receiving-side, the same as if the transmission-speed capability of the G3 facsimile 40b on the receiving side were low, such that a transmission speed that will cause a bandwidth overflow is prevented from being set up by the transmitting-side terminal unit (connected to the G3 fax 40a on the transmitting side). Thus, normal relaying of a real-time network communication is always attained by sometimes not basing the network bandwidth on the bandwidth allocated by the gatekeeper unit 30b.

Next, the process concerning the second embodiment of the gateway unit 1 is described.

The process concerning the second embodiment has two sets of processes, one being a transmitting-side process which the gateway unit 1 performs as the transmitting-side GW 1a, and the other being a receiving-side process which the gateway unit 1 performs as the receiving-side GW 1b.

Figure 9:
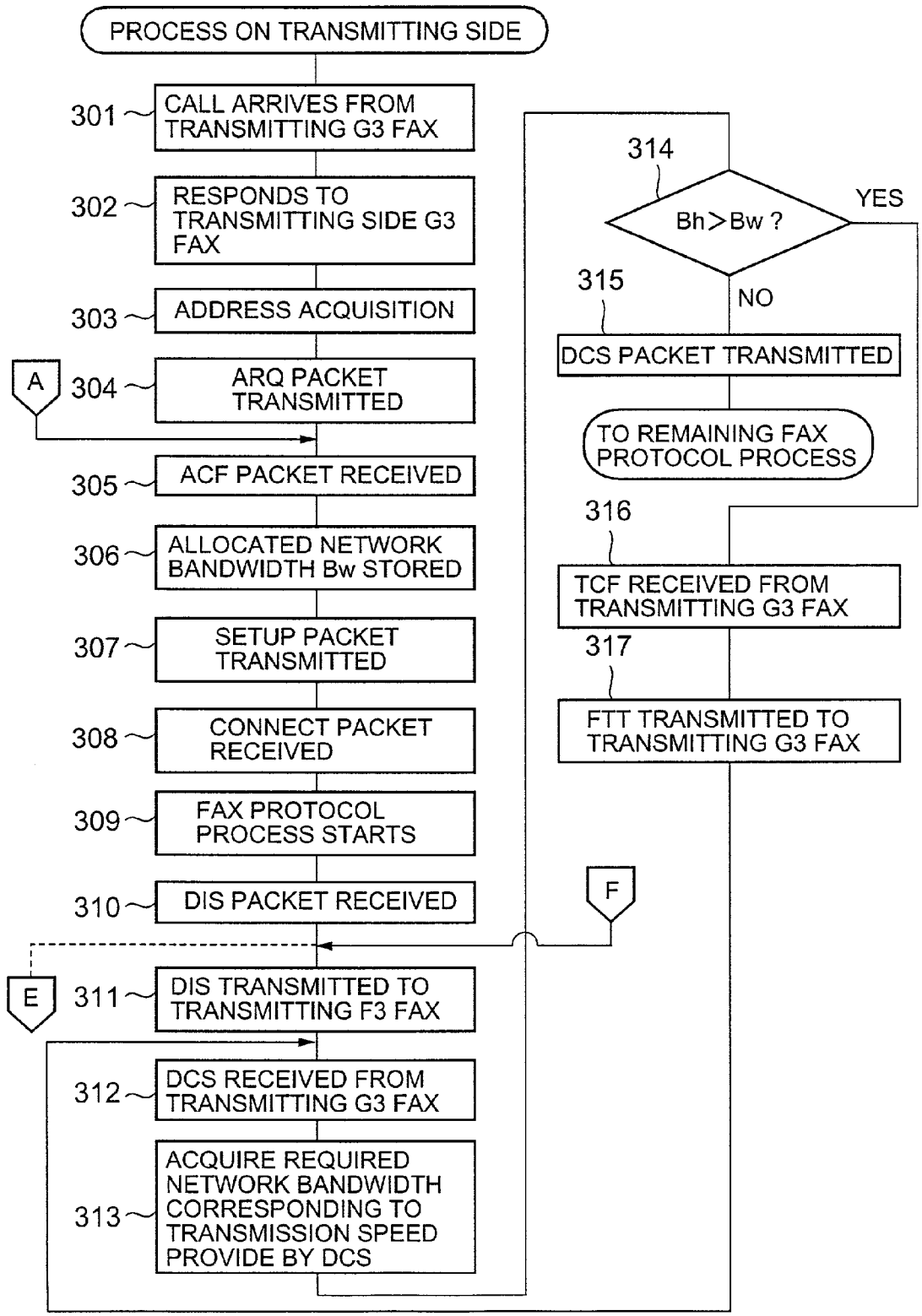
FIG. 9 is a flowchart showing the transmission-side process of a second embodiment of the gateway unit of the present invention.
Figure 10:
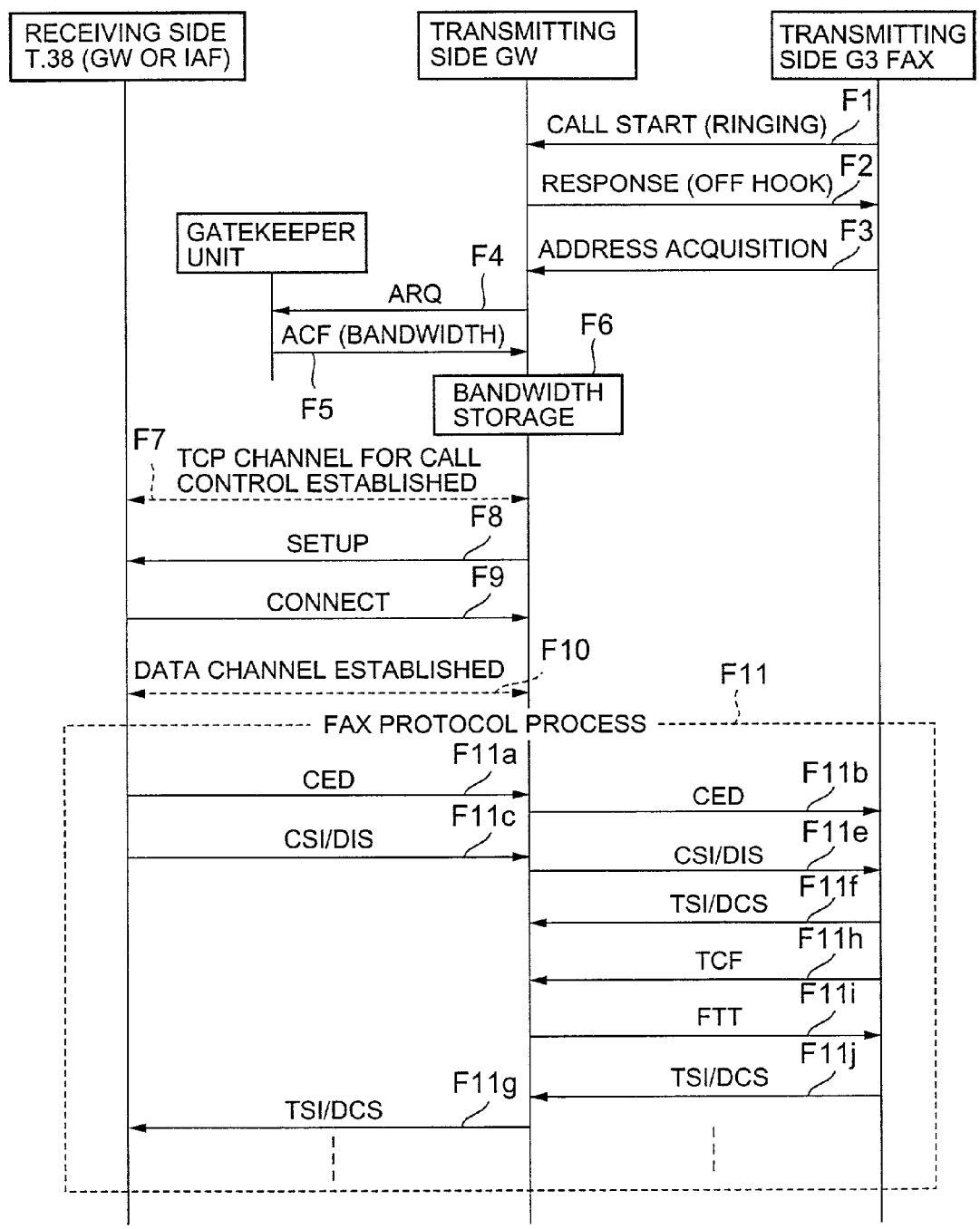
FIG. 10 shows a communication sequence corresponding to the process shown in FIG. 9.

The transmitting-side process is first described with reference to FIG. 9. Moreover, a communication sequence of the real-time network facsimile communication corresponding to the process shown in FIG. 9 is given in FIG. 10. In addition, steps 301 through 310 of the process of FIG. 9 are the same as those of the steps 101 through 110 in the transmitting-side process concerning the first embodiment shown in FIG. 5, respectively. Accordingly, phases F1 through F10 of the communication sequence of FIG. 10 are the same as those of the phases F1 through F10 of FIG. 6, and a phase F11 of FIG. 10 is almost the same as the phase F11 of FIG. 6.

In FIG. 9, by performing the steps 301 through 310 that are similar to the steps 101 through 110 of FIG. 5, network bandwidth Bw is allocated by the gatekeeper unit 30a (step 306). A digital identification signal DIS packet is received from the T.38 terminal on the receiving-side (step 310: phase F11c of FIG. 10). Then, the received digital identification signal DIS packet is converted into a modem signal without altering contents, and transmitted to the transmitting-side G3 fax 40a (step 311: phase F11e of FIG. 10).

Then, the transmitting-side G3 fax 40a sets up a transmission speed within limits of the transmission-speed capability of the receiving side as provided by the phase F11e, and the transmission-speed capability of the transmitting-side G3 fax 40a (usually the maximum transmission speed available). The selected speed and other communication parameters are transmitted as the digital transmitting instruction signal DCS, and received. (step 312: the phase F11f).

Then, the required network bandwidth Bh that corresponds to the transmission speed set up on the transmitting side as provided by the combination of the bits 11, 12, 13, and 14 of the contents of the FIF (facsimile information field) of the digital transmitting instruction signal DCS which is received, is acquired by referring to a table as shown in FIG. 4 or by multiplying by the network-delay coefficient (step 313).

Next, a check is made whether the required network bandwidth Bh acquired by the step 313 is wider than the allocated network bandwidth Bw, information of which has been acquired and stored by the step 306 (checking step 314).

If the required bandwidth Bh is wider than the allocated bandwidth Bw ("Yes" at the checking step 314), a training check signal TCF is received from the transmitting-side G3 fax (step 316: phase F11h of FIG. 10). However, the TCF signal received is not converted into a packet nor transmitted to the receiving side.

Then, to the received TCF signal, a training error signal FTT is transmitted to the transmitting-side G3 fax (step 317: phase F11i of FIG. 10), and the process returns to the step 312. In this case, the transmission speed to be set up in the digital transmitting instruction signal DCS to be received by the step 312 shall be lower than the transmission speed previously set up by the transmitting-side G3 fax 40a.

Therefore, even when the checking result at the checking step 314 was "Yes", a loop from the "Yes" of the checking step 314 will be repeated one or more times such that the required network bandwidth Bh becomes narrower than the allocated network bandwidth Bw, making the checking results of the step 314 become "No".

Only when the checking result of the step 314 is "No", the digital transmitting instruction signal DCS received as a modem signal by the step 312 will be converted into a packet and transmitted to the T.38 terminal on the receiving side (step 315: phase F11g of FIG. 10). Henceforth, the fax protocol process of the phase F11 continues.

As above described, a transmission speed that may cause a bandwidth overflow is prevented from being set up by the transmitting-side G3 fax 40a, by presenting a failure in the modem training at a transmission speed specified by the digital transmission instruction signal DCS received from the transmitting-side G3 fax 40a. Thereby, a real-time network communication is normally relayed regardless of the network bandwidth allocated by the gatekeeper unit 30a. Further, the required network bandwidth Bh is adjusted to be narrower than the allocated network bandwidth Bw according to the transmission speed finally set up by the G3 fax 40a on the transmitting side, realizing an efficient facsimile communication using the allocated network bandwidth Bw without waste.

Figure 11:
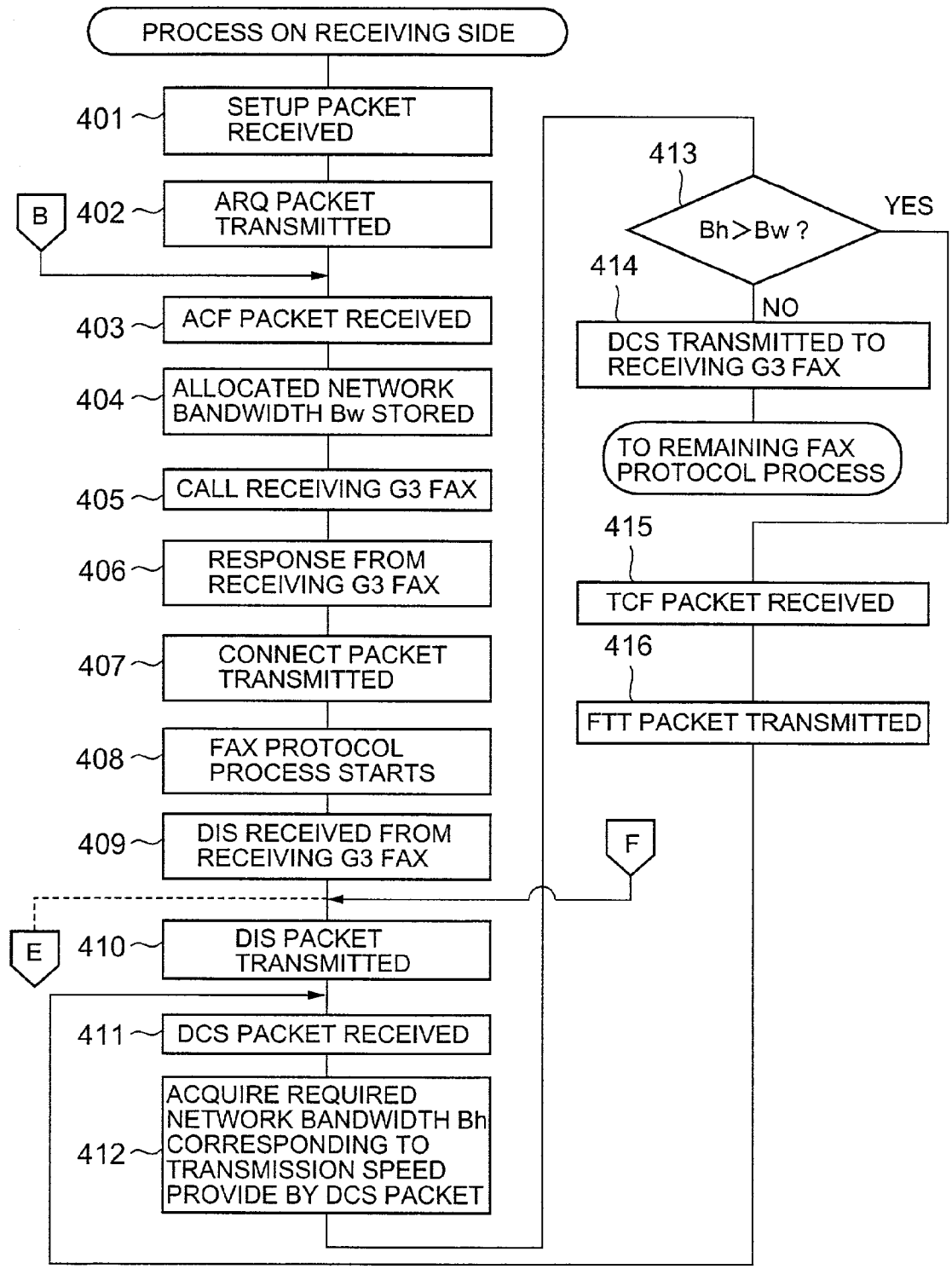
FIG. 11 is a flowchart showing the receiving-side process of the second embodiment of the gateway unit of the present invention.
Figure 12:
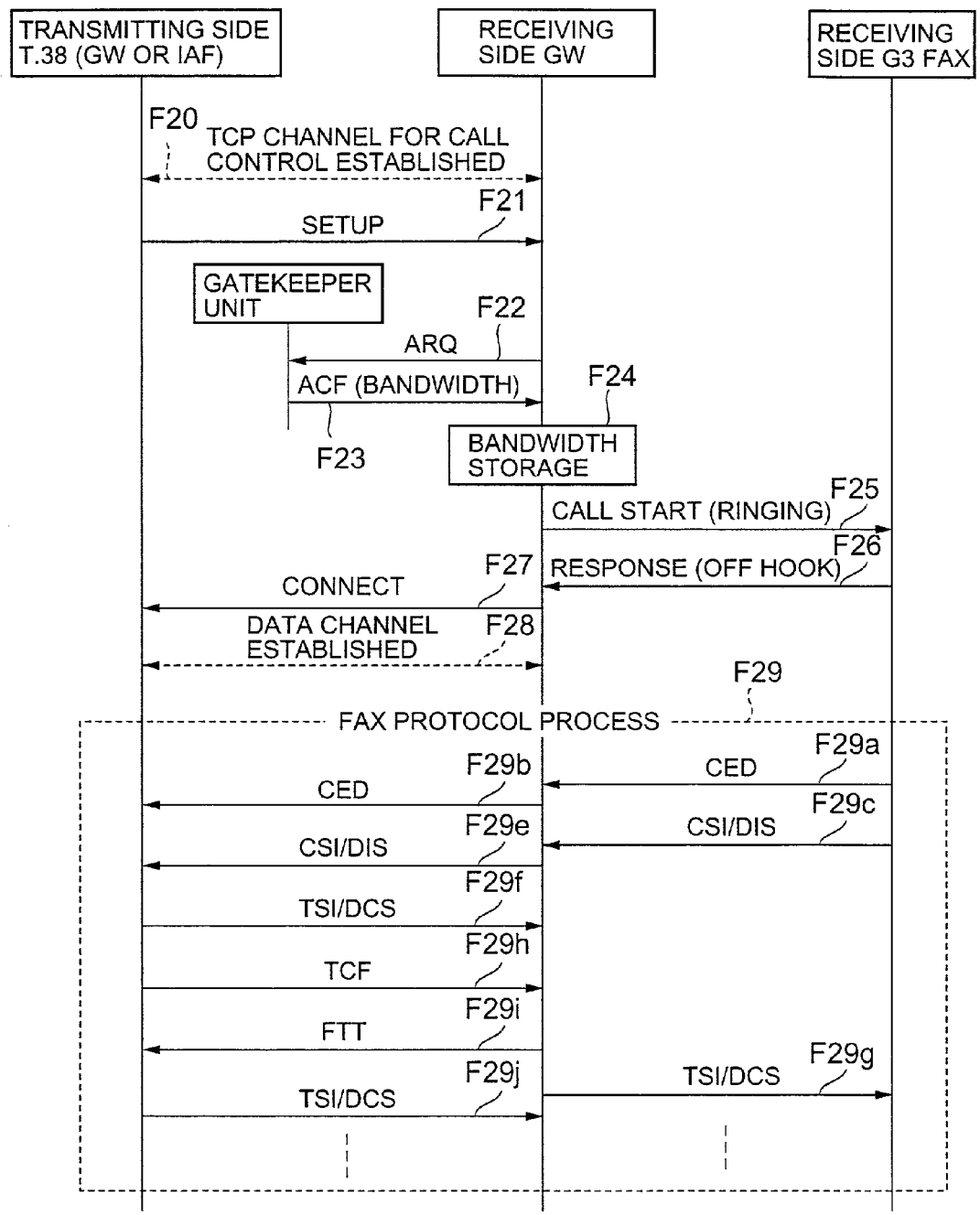
FIG. 12 shows a communication sequence corresponding to the process shown in FIG. 11.

Next, the receiving-side process concerning the 2nd embodiment is described with reference to FIG. 11. Further, the communication sequence of the real-time network facsimile communication corresponding to the process shown in FIG. 11 is given in FIG. 12. In addition, steps 401 through 409 of the process of FIG. 11 are the same as those of the steps 201 through 209 in the receiving-side process concerning the first embodiment shown in FIG. 7, respectively. Accordingly, phases F20 through F28 of the communication sequence of FIG. 12 are the same as those of the phases F20 through F28 of FIG. 8, respectively. A phase F29 of FIG. 12 is almost the same as that of the phase F29 of FIG. 8.

Through the steps 401 through 409 in FIG. 11, like the steps 201 through 209 of FIG. 7, the allocated network bandwidth Bw is acquired from the gatekeeper unit 30b (step 404), then, the modem signal of the digital identification signal DIS is received from the receiving-side G3 fax 40b (step 409: phase F29c of FIG. 12). The received modem signal of the digital identification signal DIS is converted into a packet without altering content thereof, and the packet is transmitted to the T.38 terminal on the transmitting side (step 410: phase F29e of FIG. 12).

Then, the T.38 terminal on the transmitting side (to which the transmitting-side G3 fax 40a is connected) sets up a transmission speed within limits of the transmission-speed capability of the receiving side as provided in phase F29c, and the transmission-speed capability of the transmitting-side G3 fax 40a (usually the maximum transmission speed). The set up transmission speed and other communication parameters are transmitted in the digital transmitting instruction signal DCS. The digital transmitting instruction signal DCS is received (step 411: phase F29f).

Then, required network bandwidth Bh corresponding to the transmission speed set up on the transmitting side as provided by the combination of the bits 11, 12, 13, and 14 of the contents of the FIF (facsimile information field) of the digital transmitting instruction signal DCS received is acquired by referring to a table as shown in FIG. 4, or by multiplying by the network-delay coefficient (step 412).

Next, a checking is made as to whether the required network bandwidth Bh acquired by the step 412 is wider than the allocated network bandwidth Bw acquired and stored by the step 404 (checking step 413).

If the required bandwidth Bh is wider than the allocated bandwidth Bw ("Yes" at the checking step 314), a training check signal packet TCF is received from the transmitting-side T.38 terminal (step 415: the phase F29h of FIG. 12).

However, the TCF is not converted into a modem signal nor transmitted to the receiving-side G3 fax 40*b*.

Then, to the TCF signal packet received, a training error signal packet FTT is transmitted to the T.38 terminal on the transmitting side (step 416: phase F29*i* of FIG. 12), and the process returns to the step 411. In this case, the transmission speed of the digital transmitting instruction signal DCS to be received by the step 411 shall be set up lower than the speed previously set up by the T.38 terminal (connected to the G3 fax 40*a*) on the transmitting side.

As described above, even when the result of the checking step 413 was "Yes", a loop from the "Yes" of the checking step 413 will be repeated one or more times until the required network bandwidth Bh becomes narrower than the allocated network bandwidth Bw, making the result of the checking step 413 "No".

Only when the result of the checking step 314 becomes "No", the digital transmitting instruction signal DCS received as a packet by the step 411 will be converted into a modem signal, and transmitted to the receiving-side G3 fax 40*b* (step 416: phase F29*g* of FIG. 12). Henceforth, the fax protocol processing of the phase F29 continues.

As described above, a transmission speed that may cause a bandwidth overflow is prevented from being set up by the T.38 terminal (connected to the G3 fax 40*a*) on the transmission side, by presenting a failure in the modem training at a transmission speed specified by the digital transmitting instruction signal DCS received from the transmitting-side T.38 terminal. Thereby, a normal relaying of the real-time network communication is realized regardless of the network bandwidth allocated from gatekeeper unit 30*b*. Further, since the required network bandwidth Bh is adjusted to be narrower than the allocated network bandwidth Bw according to the transmission speed finally set up by the transmitting-side T.38 terminal (connected to the G3 fax 40*a*), an efficient facsimile communication is attained using the allocated network bandwidth Bw without waste.

Next, the process concerning the third embodiment of the gateway unit 1 is described.

The process concerning the third embodiment has two sets of processes, one being a transmitting-side process which the gateway unit 1 performs as the transmitting-side GW 1*a*, and the other being a receiving-side process performed by the gateway unit 1 as the receiving-side GW 1*b*.

First, the transmitting-side process is described with reference to FIG. 13. Steps 501 through 505 of FIG. 13 are equivalent to the steps 101 through 104 of FIG. 5 concerning the first embodiment, and the steps 301 through 304 shown in FIG. 9 concerning the second embodiment.

Figure 13:
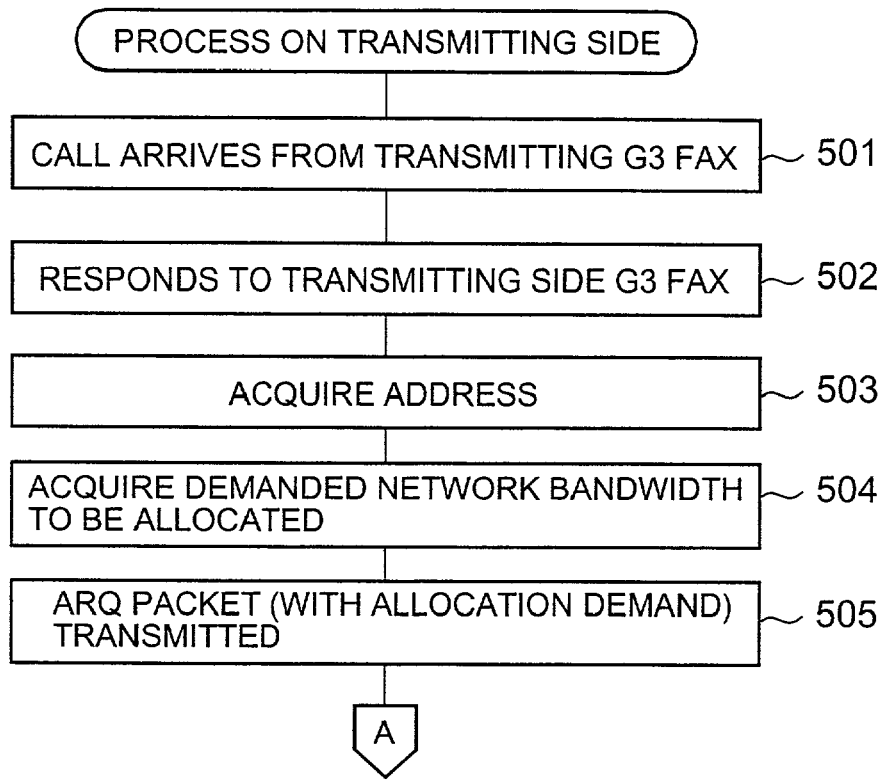
FIG. 13 is a flowchart showing the transmission-side process of a third embodiment of the gateway unit of the present invention.

That is, in FIG. 13, the transmitting-side GW 1*a* receives a call through the PSTN 50*a* from the transmitting-side G3 fax 40*a* (step 501), and responds to the call (step 502).

Further, a receiving address (an IP address (and a fax number)) on the receiving side is acquired (step 503).

The steps so far are the same as those of the steps 101 through 103, and the steps 301 through 303. However, in the step 504, information about network bandwidth that will be demanded for an allocation, which has been set up and stored beforehand into the storage 5, is acquired. The bandwidth to be demanded for allocation is set up at the maximum facsimile transmission speed that can be set up in the real-time network facsimile communication to relay. Specifically, if the maximum facsimile transmission speed that the transmitting-side GW 1*a* can handle is 14,400 bps, the network bandwidth to be demanded for an allocation shall be 17,280 bps if the network delay coefficient is 1.2, as shown in FIG. 4.

Further, an ARQ packet including the acquired information about the network bandwidth to be demanded is transmitted to the gatekeeper unit 30*a*, and securing the bandwidth is demanded while performing a communication start demand to the gatekeeper unit 30*a* (which is set up by option data of the ARQ).

In this case, the gatekeeper unit 30*a* determines the bandwidth to be allocated, therefore, the demanded bandwidth may not necessarily be secured. When bandwidth as required is secured, the adjustment process to narrow the required network bandwidth Bh to make the required network bandwidth Bh narrower than the allocated network bandwidth Bw in the process after the step 105 of FIG. 5, or the process after the step 305 of FIG. 9 becomes unnecessary. Thereby, the transmission speed is not restricted by a narrowness of the bandwidth, realizing an efficient facsimile communication. On the other hand, when the bandwidth as required is not secured, the adjustment process takes place to make the required network bandwidth Bh narrower according to the process after the step 105 of FIG. 5, or the process after the step 305 of FIG. 9 so that the required network bandwidth Bh becomes narrower than the allocated network bandwidth Bw. Thereby, a communication error is prevented from occurring. In addition, in a situation where it is guaranteed that bandwidth as required is secured, the adjustment process after the step 105 of FIG. 5, or after the step 305 of FIG. 9 to make the required network bandwidth Bh narrower than the allocated network bandwidth Bw, becomes unnecessary.

Next, the receiving-side process is described with reference to FIG. 14. Steps 601 through 603 of FIG. 14 are to replace the steps 201 and 202 in the process of FIG. 7 concerning the first embodiment, and the steps 401 and 402 concerning the second embodiment shown in FIG. 11.

Figure 14:
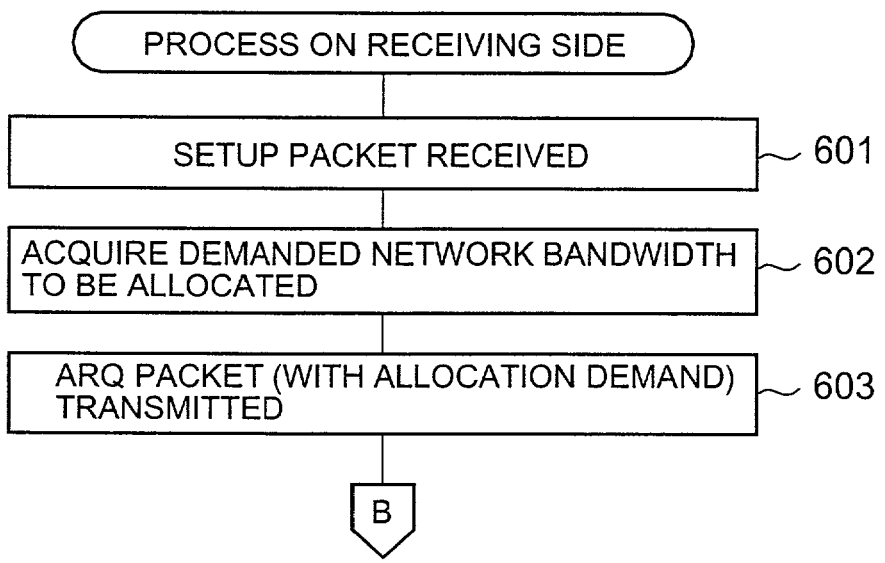
FIG. 14 is a flowchart which showing the receiving-side process of the third embodiment of the gateway unit of the present invention.

That is, in FIG. 14, the receiving-side GW 1*b* receives a SETUP packet from the T.38 terminal on the transmitting side (the IAF 20*a* or the GW 1*a*) (step 601) after a TCP channel for call control is established.

Prior to starting the communication, information about network bandwidth to be demanded for allocation, which has been set up and stored beforehand in the storage 5, is acquired in the step 602. Henceforth, the communication through the packet network 60*a* is started.

An ARQ packet that includes the acquired information about the network bandwidth to be demanded is transmitted to the gatekeeper unit 30*b*, demanding bandwidth while performing a communication start demand to the gatekeeper unit 30*b* (which is set up by option data of the ARQ).

In this case, the gatekeeper unit 30*a* determines the bandwidth, therefore, the demanded bandwidth may not necessarily be secured. When the bandwidth as required is secured, the adjustment process in the process after the step 203 of FIG. 7, or the process after the step 403 of FIG. 11 to narrow the required network bandwidth Bh, becomes unnecessary because the required network bandwidth Bh is narrower than the allocated network bandwidth Bw. Thereby, the transmission speed is not restricted for the narrowness of the bandwidth, realizing an efficient facsimile communication. On the other hand, when the bandwidth as required is not secured, the adjustment process takes place to make the required network bandwidth Bh narrower through the process after the step 203 of FIG. 7, or the process after the step 403 of FIG. 11 so that the required network bandwidth Bh becomes narrower than the allocated network bandwidth Bw. Thereby, a communication error is prevented from occurring. In addition, in a situation where it is guaranteed that bandwidth as required is secured, the adjustment process after the step 203 of FIG. 7, or the process after the step 403 of FIG. 11 to make the required network bandwidth Bh narrower than the allocated network bandwidth Bw becomes unnecessary.

Next, the process concerning the fourth embodiment of the gateway unit 1 is described with reference to FIG. 15.

The process of FIG. 15 is inserted between the step 111 and the checking step 112 of the process of FIG. 5 concerning the first embodiment, and between the step 210 and the checking step 211 shown in FIG. 7 concerning the first embodiment.

That is, in FIG. 15, a check is made as to whether the required network bandwidth Bh acquired by the step 111 of FIG. 5 or the step 210 of FIG. 7 is wider than the allocated network bandwidth Bw acquired and stored by the step 106 of FIG. 5 or the step 204 of FIG. 7 (checking step 701).

If the required network bandwidth Bh is determined by the checking step 701 to be narrower than the allocated network bandwidth Bw ("No" in the checking step 701), the process moves to the checking step 112 of FIG. 5 or the checking step 211 of FIG. 7 without carrying out anything, since the allocated network bandwidth Bw is sufficient as it is.

On the other hand, if the checking step 701 determines that the required network bandwidth Bh is wider than the allocated network bandwidth Bw ("Yes" at the checking step 701), the allocated network bandwidth Bw is insufficient as it is. Then, a BRQ packet that includes a demand for a bandwidth increase to the required network bandwidth Bh is transmitted to the gatekeeper unit 30a or the gatekeeper unit 30b (step 702). If a BCF packet in response to the BRQ packet is received ("Yes" at checking step 703), the allocated network bandwidth Bw stored into the storage 5 till then is updated to an increased network bandwidth Bw after an allocation increase is provided by the BCF packet (step 704). Then, the process moves onward to the checking step 112 of FIG. 5 or the checking step 211 of FIG. 7. When the BCF packet is not received ("No" at the checking step 703), the process moves onward to the checking step 112 of FIG. 5, or the checking step 211 of FIG. 7 without changing the allocated network bandwidth Bw currently stored in the storage 5.

In this case, because the gatekeeper unit 30a or 30b determines bandwidth to be actually allocated, a demanded bandwidth may not necessarily be secured. If the bandwidth is allocated as required, the process after the checking step 112 of FIG. 5 and the process after the checking step 211 of FIG. 7 to narrow the required network bandwidth Bh becomes unnecessary because the required network bandwidth Bh is narrower than the allocated network bandwidth Bw. The transmission speed is not restricted for narrowness of the bandwidth, realizing an efficient facsimile communication. On the other hand, if the bandwidth as required is not secured, the adjustment process after the checking step 112 of FIG. 5, or after the checking step 211 of FIG. 7, takes place to make the required network bandwidth Bh narrower than the allocated network bandwidth Bw. Thereby, a communication error is prevented from occurring. Moreover, since the demand for a bandwidth increase against the allocated network bandwidth Bw performed in the step 702 is in accordance with transmission-speed capability actually provided by the digital identification signal DIS from the receiving side, network bandwidth is not allocated uselessly.

Next, the process concerning the fifth embodiment in the gateway unit 1 is described with reference to FIG. 16.

The process of FIG. 16 is inserted between the steps 310 and 311 in the process of FIG. 9 concerning the second embodiment, and between the steps 409 and 410 concerning the second embodiment shown in FIG. 11.

That is, in FIG. 16, the required network bandwidth Bh corresponding to the transmission-speed capability provided by the digital identification signal DIS in a packet by the step 310 of FIG. 9 or received in a modem signal by the step 409 of FIG. 11 is acquired by referring to the table as shown in FIG. 4, or by multiplying by the network-delay coefficient (step 801).

A check is made as to whether the required network bandwidth Bh acquired by the step 801 is wider than the allocated network bandwidth Bw that has been acquired and stored by the step 306 of FIG. 9 or the step 404 of FIG. 11 (checking step 802).

In the checking step 802, if the required network bandwidth Bh is determined to be narrower than the allocated network bandwidth Bw ("No" at the checking step 802), the allocated network bandwidth Bw is sufficient as it is, therefore, the process moves on to the step 311 of FIG. 9 or the step 410 of FIG. 11 without carrying out any additional action.

If the required network bandwidth Bh is determined by the checking step 802 to be wider than the allocated network bandwidth Bw ("Yes" at checking step 802), the allocated network bandwidth Bw is insufficient as it is. Then, a bandwidth increase demanding packet BRQ that includes a demand to increase the bandwidth to the required network bandwidth Bh is transmitted to the gatekeeper unit 30a or gatekeeper unit 30b (step 803). If a BCF packet is received in response to the BRQ packet ("Yes" at checking step 804), the allocated network bandwidth Bw stored in the storage 5 till then is updated to a newly allocated network bandwidth Bw after an allocation increase is provided by the BCF packet (step 805). Then, the process moves on to the step 311 of FIG. 9 or the step 410 of FIG. 11. When the BCF packet is not received ("No" at the checking step 804), the allocated network bandwidth Bw currently stored in the storage 5 is used without alteration in the step 311 of FIG. 9, or the step 410 of FIG. 11.

In this case, the gatekeeper unit 30a or 30b determines bandwidth actually secured, therefore, the demanded bandwidth may not necessarily be secured. If the bandwidth as required is secured, an adjustment to narrow the required network bandwidth Bh becomes unnecessary prior to the step 311 of FIG. 9, and the step 410 of FIG. 11. This is because the required network bandwidth Bh is narrower than the allocated network bandwidth Bw, and the transmission speed is not restricted for the narrowness of the bandwidth. Thereby, an efficient facsimile communication is realized. If the bandwidth is not secured as required, an adjustment to narrow the required network bandwidth Bh is performed through the steps 311 and onward of FIG. 9, and the steps 410 and onward of FIG. 11 such that the required network bandwidth Bh becomes narrower than the allocated network bandwidth Bw. Thereby, a communication error is prevented from occurring. Moreover, because the allocated network bandwidth Bw demanded by the step 803 is in accordance with the transmission-speed capability actually provided by the digital identification signal DIS from the receiving side at the maximum, network bandwidth is not allocated uselessly.

According to the above embodiments, the gateway unit 1 eventually adjusts the allocated network bandwidth from the gatekeeper unit 30 to be wider than the required network bandwidth corresponding to the facsimile transmission speed, and a normal real-time network facsimile communication can be guaranteed.

In addition, in the embodiments described above, the present invention was applied to the gateway unit 1 which is a T.38 GW type terminal. It is emphasized that the present invention can also be applied to an IAF type T.38 terminal (a network facsimile apparatus) which has the same relay function of the real-time facsimile communication as the gateway unit 1, and a G3 facsimile apparatus and the like which has the same relay function of the real-time facsimile communication as the gateway unit 1.

According to one feature of the present invention, required network bandwidth which allows a communication at a transmission speed set up between transmitting/receiving facsimile apparatuses and a partner terminal unit (such as a network facsimile apparatus and a gateway unit connected to the facsimile apparatus via a PSTN) is adjusted to become equal to or narrower than an allocated network bandwidth which is network bandwidth in a packet network, and allocated by a gatekeeper unit to a gateway unit of the present invention. Thereby, a normal communication is realized, avoiding an occurrence of a communication error between the facsimile apparatus and the partner terminal unit due to a narrow network bandwidth in the packet network.

According to another feature of the present invention, the allocated network bandwidth is not based on a transmission speed that can be set up between the facsimile apparatus and the partner terminal unit, rather a sufficiently wide network bandwidth is demanded of the gatekeeper unit. Thereby, the required network bandwidth will be narrower than the allocated network bandwidth. In this manner, so long that the gatekeeper unit has a sufficiently wide bandwidth available and allocates network bandwidth as required, the required network bandwidth will be narrower than the allocated network bandwidth, realizing a normal communication without a communication error due to a narrow network bandwidth in the packet network. Further, since a wide network bandwidth is reserved, the required network bandwidth becomes narrower than the allocated network bandwidth. Thereby, a communication at the maximum speed set up by the facsimile apparatus and the partner terminal unit is realized without a restriction, saving a communication cost.

According to another feature of the present invention, a normal communication between the facsimile apparatus and the partner terminal unit is realized without a communication error due to a narrow network bandwidth, because the required network bandwidth becomes equal to or narrower than the allocated network bandwidth so long as the gatekeeper unit allocates network bandwidth as required since an available bandwidth in the packet network is sufficient. Here, the required network bandwidth is that demanded of the gatekeeper unit, corresponds to a transmission speed capability provided by the facsimile control signal from the facsimile apparatus or the partner terminal unit, and is a needed and sufficient network bandwidth that is equal to or narrower than the allocated network bandwidth. Further, the allocated network bandwidth is made to meet with the required network bandwidth, the transmission speed set up between the facsimile apparatus and the partner terminal unit is not restricted, enabling a communication at a highest speed available. Thereby, advantages are that a communication cost is made lower and that the network bandwidth of the packet network is not allocated wastefully.

According to another feature of the present invention, a normal communication without a communication error is realized when the allocated network bandwidth is narrow, by adjusting the required network bandwidth corresponding to actual transmission speed set up according to a transmission speed capability of the facsimile apparatus on the transmitting side and a transmission speed capability provided by the facsimile control signal from the receiving side, by altering the transmission speed capability of the facsimile control signal received from the partner terminal unit on the receiving side and transmitting to the facsimile apparatus on the transmitting side to show that the transmission speed capability of the partner terminal unit on the receiving side is lower when the allocated network bandwidth allocated by the gatekeeper unit is narrower than the required network bandwidth for a reason of a limited amount of available network bandwidth of the packet network and the like.

According to another feature of the present invention, a normal communication without a communication error is realized when the allocated network bandwidth is narrow, by adjusting the required network bandwidth corresponding to actual transmission speed set up according to a transmission speed capability of the partner terminal unit on the transmitting side (which is a facsimile apparatus on the transmitting side connected to the PSTN when the partner terminal unit is a gateway unit) and a transmission speed capability provided by the facsimile control signal from the receiving side, by altering the transmission speed capability of the facsimile control signal received from the facsimile apparatus on the receiving side and transmitting to the partner terminal unit on the transmitting side to show that the transmission speed capability of the facsimile apparatus on the receiving side is lower when the allocated network bandwidth allocated by the gatekeeper unit is narrower than the required network bandwidth for a reason of a limited amount of available network bandwidth of the packet network and the like.

According to another feature of the present invention, a normal communication without a communication error is realized when the allocated network bandwidth allocated by the gatekeeper unit is narrower than the required network bandwidth for a reason of a limited amount of available network bandwidth of the packet network and the like, by providing a modem training failure signal at a communication speed set up by the facsimile control signal from the facsimile apparatus on the transmitting side so that the required network bandwidth corresponding to an eventual transmission speed becomes equal to or narrower than the allocated network bandwidth. Further, the transmission speed is determined by the facsimile control signal from the transmitting side, not by the facsimile control signal from the receiving side, providing an optimum transmission speed within the allocated network bandwidth without wasting network bandwidth.

According to another feature of the present invention, a normal communication without a communication error is realized when the allocated network bandwidth allocated by the gatekeeper unit is narrower than the required network bandwidth for a reason of a limited amount of available network bandwidth of the packet network and the like, by providing a modem training failure signal at a communication speed set up by the facsimile control signal from the partner terminal unit on the transmitting side so that the required network bandwidth corresponding to an eventual transmission speed becomes equal to or narrower than the allocated network bandwidth. Further, the transmission speed is determined by the facsimile control signal from the transmitting side, not by the facsimile control signal from the receiving side, providing an optimum transmission speed within the allocated network bandwidth without wasting network bandwidth.

According to another feature of the present invention, the required network bandwidth corresponding to the transmission speed set up between a communication apparatus on the packet network and a communication apparatus on the PSTN is adjusted to be narrower than the allocated network bandwidth allocated by the gatekeeper unit. Thereby, a normal communication without a communication error due to a narrow network bandwidth of the packet network is realized between the communication apparatus on the packet network and the communication apparatus on the PSTN.

According to another feature of the present invention, an effect similar to that attained by claim 8 is obtained in a gateway unit that also performs a facsimile communication with another communication apparatus on the packet network.

According to another feature of the present invention, an effect similar to that attained by claim 8 is obtained in a gateway unit that also performs a facsimile communication with another communication apparatus on the PSTN.

The present application is based on Japanese priority application No. 2000-402494 filed on Dec. 28, 2000, with the Japanese Patent Office, the entire contents of which are hereby incorporated by reference.

What is claimed is:

1. A communication system that realizes a real-time facsimile communication between a facsimile apparatus on a PSTN and a partner terminal unit on a packet network, the gateway unit comprising:

a communication controller configured to adjust required network bandwidth corresponding to a transmission speed set up between the facsimile apparatus and the partner terminal unit to become equal to or narrower than the allocated network bandwidth, wherein a gateway unit connected to the packet network and the PSTN issues a demand for network bandwidth allocation to a gatekeeper unit on the packet network prior to starting a communication, and the communication through the packet network is performed within an allocated network bandwidth allocated by the gatekeeper unit in response to the demand, while a packetized facsimile control signal received from the partner terminal unit through the packet network is converted in real-time into a modem signal and transmitted to the facsimile apparatus through the PSTN, and a facsimile control signal received from the facsimile apparatus through the PSTN as a modem signal is packetized in real-time and transmitted to the partner terminal unit through the packet network.

2. A gateway controlling method which controls a gateway unit that is connected to a packet network and a PSTN and realizes a real-time facsimile communication between a facsimile apparatus on the PSTN and a partner terminal unit on the packet network, comprising:

a controlling method configured to control the gateway unit which performs an adjustment such that required network bandwidth corresponding to a transmission speed set up between the facsimile apparatus and the partner terminal unit becomes equal to or narrower than the allocated network bandwidth, wherein a demand for network bandwidth allocation is issued to a gatekeeper unit on the packet network prior to starting a communication, the communication through the packet network is performed within an allocated network bandwidth allocated by the gatekeeper unit in response to the demand, while a packetized facsimile control signal received from the partner terminal unit through the packet network is converted in real-time into a modem signal and transmitted to the facsimile apparatus through the PSTN, and a facsimile control signal received from the facsimile apparatus through the PSTN as a modem signal is packetized in real-time and transmitted to the partner terminal unit through the packet network.

3. A gateway unit that is connected to a packet network and a PSTN and realizes a real-time facsimile communication between a facsimile apparatus on the PSTN and a partner terminal unit on the packet network, comprising:

a communication controller configured to adjust the required network bandwidth corresponding to a transmission speed set up between the facsimile apparatus and the partner terminal unit to become equal to or narrower than the allocated network bandwidth, wherein the communication controller adjusts the required network bandwidth by demanding a reassignment of network bandwidth of the gatekeeper unit where the required network bandwidth corresponding to a predetermined transmission speed provided by the facsimile control signal received from the partner terminal unit in the packet network on the receiving side, or from the facsimile apparatus in the PSTN on the receiving side is wider than the allocated network bandwidth allocated by the gatekeeper unit at starting the communication.

4. A gateway unit that is connected to a packet network and a PSTN and realizes a real-time facsimile communication between a facsimile apparatus on the PSTN and a partner terminal unit on the packet network, comprising:

a communication controller configured to adjust the required network bandwidth corresponding to a transmission speed set up between the facsimile apparatus and the partner terminal unit to become equal to or narrower than the allocated network bandwidth, wherein when the required network bandwidth corresponding to a predetermined transmission speed provided by the facsimile control signal received from the partner terminal unit in the packet network on the receiving side is wider than the allocated network bandwidth, the communication controller adjusts the required network bandwidth by altering information content indicative of the transmission speed in the facsimile control signal to a transmission speed that requires equal to or narrower than the allocated network bandwidth, converting the facsimile control signal into a modem signal and transmitting the modem signal to the facsimile apparatus in the PSTN on the transmitting side.

5. A gateway unit that is connected to a packet network and a PSTN and realizes a real-time facsimile communication between a facsimile apparatus on the PSTN and a partner terminal unit on the packet network, comprising:

a communication controller configured to adjust the required network bandwidth corresponding to a transmission speed set up between the facsimile apparatus and the partner terminal unit to become equal to or narrower than the allocated network bandwidth, wherein when the required network bandwidth corresponding to a predetermined transmission speed provided by the facsimile control signal received from the facsimile apparatus in the PSTN on the receiving side is wider than the allocated network bandwidth, the communication controller adjusts the required network bandwidth by altering information content indicative of the transmission speed in the facsimile control signal to a transmission speed that requires bandwidth equal to or narrower than the allocated network bandwidth, converting the facsimile control signal into a packet and transmitting the packet to the partner terminal unit in the packet network.

6. A gateway unit that is connected to a packet network and a PSTN and realizes a real-time facsimile communication between a facsimile apparatus on the PSTN and a partner terminal unit on the packet network, comprising:

a communication controller configured to adjust the required network bandwidth corresponding to a transmission speed set up between the facsimile apparatus and the partner terminal unit to become equal to or narrower than the allocated network bandwidth, wherein when the required network corresponding to a predetermined transmission speed provided by the facsimile control signal received from the facsimile apparatus in the PSTN on the transmitting side is wider than the allocated network bandwidth, the communication controller adjusts the required network bandwidth by transmitting a dummy training failure signal to the facsimile apparatus on the transmission side in response to a predetermined modem training signal received from the facsimile apparatus in the PSTN on the transmitting side, until the required network bandwidth corresponding to a transmission speed provided by the facsimile control signal that will be retransmitted from the facsimile apparatus on the transmitting side becomes equal to or narrower than the allocated network bandwidth.

7. A gateway unit that is connected to a packet network and a PSTN and realizes a real-time facsimile communication between a facsimile apparatus on the PSTN and a partner terminal unit on the packet network, comprising:

a communication controller configured to adjust the required network bandwidth corresponding to a transmission speed set up between the facsimile apparatus and the partner terminal unit to become equal to or narrower than the allocated network bandwidth, wherein when the required network bandwidth corresponding to a predetermined transmission speed provided by the facsimile control signal received from the partner terminal unit in the packet network on the transmitting side is wider than the allocated network bandwidth, the communication controller adjusts the required network bandwidth by transmitting a dummy training failure signal to the partner terminal unit on the transmitting side in response to a modem training signal received from the partner terminal unit in the packet network on the transmitting side, until the required network bandwidth corresponding to a transmission speed provided by the facsimile control signal that will be retransmitted from the partner terminal unit on the transmitting side becomes equal to or narrower than the allocated network bandwidth.

8. A gateway unit that is connected to a packet network and a PSTN and realizes a real-time facsimile communication between a facsimile apparatus on the PSTN and apartner terminal unit on the packet network, comprising:

a communication controller configured to adjust the required network bandwidth corresponding to a transmission speed set up between the facsimile apparatus and the partner terminal unit to become equal to or narrower than the allocated network bandwidth, wherein an allocation demand for required network bandwidth is issued to a gatekeeper unit on the packet network prior to starting a communication, the communication through the packet network is performed within an allocated network bandwidth allocated by the gatekeeper unit in response to the allocation demand, while a packetized facsimile control signal received from the partner terminal unit through the packet network is converted in real-time into a modem signal and transmitted to the facsimile apparatus through the PSTN, and a facsimile control signal received from the facsimile apparatus through the PSTN as a modem signal is packetized in real-time and transmitted to the partner terminal unit through the packet network.

9. A communication system that realizes a real-time facsimile communication between a facsimile apparatus on a PSTN and a partner terminal unit on a packet network, the gateway unit comprising:

a communication controller configured to adjust required network bandwidth corresponding to a transmission speed set up between the facsimile apparatus and the partner terminal unit to become equal to or narrower than the allocated network bandwidth, wherein when the required network bandwidth corresponding to a predetermined transmission speed provided by the facsimile control signal received from the partner terminal unit in the packet network on the transmitting side is wider than the allocated network bandwidth, the communication controller adjusts the required network bandwidth by transmitting a dummy training failure signal to the partner terminal unit on the transmitting side in response to a modem training signal received from the partner terminal unit in the packet network on the transmitting side, until the required network bandwidth corresponding to a transmission speed provided by the facsimile control signal that will be retransmitted from the partner terminal unit on the transmitting side becomes equal to or narrower than the allocated network bandwidth.

10. A communication system that realizes a real-time facsimile communication between a facsimile apparatus on a PSTN and a partner terminal unit on a packet network, the gateway unit comprising:

a communication controller configured to adjust required network bandwidth corresponding to a transmission speed set up between the facsimile apparatus and the partner terminal unit to become equal to or narrower than the allocated network bandwidth, wherein when the required network corresponding to a predetermined transmission speed provided by the facsimile control signal received from the facsimile apparatus in the PSTN on the transmitting side is wider than the allocated network bandwidth, the communication controller adjusts the required network bandwidth by transmitting a dummy training failure signal in response to a predetermined modem training signal received from the facsimile apparatus in the PSTN on the transmitting side, until the required network bandwidth corresponding to a transmission speed provided by the facsimile control signal that will be retransmitted from the facsimile apparatus on the transmitting side becomes equal to or narrower than die allocated network bandwidth.

11. A communication system that realizes a real-time facsimile communication between a facsimile apparatus on a PSTN and a partner terminal unit on a packet network, the gateway unit comprising:

a communication controller configured to adjust required network bandwidth corresponding to a transmission speed set up between the facsimile apparatus and the partner terminal unit to become equal to or narrower than the allocated network bandwidth, wherein when the required network bandwidth corresponding to a predetermined transmission speed provided by the facsimile control signal received from the facsimile apparatus in the PSTN on the receiving side is wider than the allocated network bandwidth, the communication controller adjusts the required network bandwidth by altering information content indicative of the transmission speed in the facsimile control signal to a transmission speed that requires bandwidth equal to or narrower than the allocated network bandwidth, converting the facsimile control signal into a packet and transmitting the packet to the partner terminal unit in the packet network.

12. A communication system that realizes a real-time facsimile communication between a facsimile apparatus on a PSTN and a partner terminal unit on a packet network, the gateway unit comprising:

a communication controller configured to adjust required network bandwidth corresponding a transmission speed set up between the facsimile apparatus and the partner terminal unit to become equal to or narrower than the allocated network bandwidth, wherein when the required network bandwidth corresponding to a predetermined transmission speed provided by the facsimile control signal received from the partner terminal unit in the packet network on the receiving side is wider than the allocated network bandwidth, the communication controller adjusts the required network bandwidth by altering information content indicative of the transmission speed in the facsimile control signal to a transmission speed that requires equal to or narrower than the allocated network bandwidth, converting the facsimile control signal into a modem signal and transmitting the modem signal to the facsimile apparatus in the PSTN on the transmitting side.

13. A gateway controlling method which controls a gateway unit that is connected to a packet network and a PSTN and realizes a real-time facsimile communication between a facsimile apparatus on the PSTN and a partner terminal unit on the packet network, comprising:

a controlling method configured to control the gateway unit which performs an adjustment such that required network bandwidth corresponding to a transmission speed set up between the facsimile apparatus and the partner terminal unit becomes equal to or narrower than the allocated network bandwidth, wherein the adjustment is performed such that the required network bandwidth becomes equal to or narrower than the allocated network bandwidth, by demanding the required network bandwidth of the gatekeeper unit for a reassignment of network bandwidth where the required network bandwidth corresponding to a predetermined transmission speed provided by the facsimile control signal received from the partner terminal unit in the packet network on the receiving side, or from the facsimile apparatus in the PSTN on the receiving side is wider than the allocated network bandwidth allocated by the gatekeeper unit at starting the communication.

14. A gateway controlling method which controls a gateway unit that is connected to a packet network and a PSTN and realizes a real-time facsimile communication between a facsimile apparatus on the PSTN and a partner terminal unit on the packet network, comprising:

a controlling method configured to control the gateway unit which performs an adjustment such that required network bandwidth corresponding to a transmission speed set up between the facsimile apparatus and the partner terminal unit becomes equal to or narrower than the allocated network bandwidth, wherein the adjustment is performed such that the required network bandwidth becomes equal to or narrower than the allocated network bandwidth where the required network bandwidth corresponding to a predetermined transmission speed provided by the facsimile control signal received from the partner terminal unit in the packet network on the receiving side is wider than the allocated network bandwidth, by altering information content indicative of the transmission speed in the facsimile control signal to a transmission speed that requires equal to or narrower than the allocated network bandwidth, converting the facsimile control signal into a modem signal and transmitting the modem signal to the facsimile apparatus in the PSTN on the transmitting side.

15. A gateway controlling method which controls a gateway unit that is connected to a packet network and a PSTN and realizes a real-time facsimile communication between a facsimile apparatus on the PSTN and a partner terminal unit on the packet network, comprising:

a controlling method configured to control the gateway unit which performs an adjustment such that required network bandwidth corresponding to a transmission speed set up between the facsimile apparatus and the partner terminal unit becomes canal to or narrower than the allocated network bandwidth, wherein the adjustment is performed such that the required network bandwidth becomes equal to or narrower than the allocated network bandwidth, where the required network bandwidth corresponding to a predetermined transmission speed provided by the facsimile control signal received from the facsimile apparatus in the PSTN on the receiving side is wider than the allocated network bandwidth, by altering information content indicative of the transmission speed in the facsimile control signal to a transmission speed that requires bandwidth equal to or narrower than the allocated network bandwidth, converting the facsimile control signal into a packet and transmitting the packet to the partner terminal unit in the packet network.

16. A gateway controlling method which controls a gateway unit that is connected to a packet network and a PSTN and realizes a real-time facsimile communication between a facsimile apparatus on the PSTN and a partner terminal unit on the packet network, comprising:

a controlling method configured to control the gateway unit which performs an adjustment such that repaired network bandwidth corresponding to a transmission speed set an between the facsimile apparatus and the partner terminal unit becomes equal to or narrower than the allocated network bandwidth, wherein the adjustment is performed such that the required network bandwidth becomes equal to or narrower than the allocated network, where the required network corresponding to a predetermined transmission speed provided by the facsimile control signal received from the facsimile apparatus in the PSTN on the transmitting side is wider than the allocated network bandwidth, by transmitting a dummy training failure signal in response to a predetermined modem training signal received from the facsimile apparatus in the PSTN on the transmitting side, until the required network bandwidth corresponding to a transmission speed provided by the facsimile control signal that will be retransmitted from the facsimile apparatus on the transmitting side becomes equal to or narrower than the allocated network bandwidth.

17. A gateway controlling method which controls a gateway unit that is connected to a packet network and a PSTN and realizes a real-time facsimile communication between a facsimile apparatus on the PSTN and a partner terminal unit on the packet network, comprising:
   a controlling method configured to control the gateway unit which performs an adjustment such that required network bandwidth corresponding to a transmission speed set up between the facsimile apparatus and the partner terminal unit becomes equal to or narrower than the allocated network bandwidth,
   wherein an adjustment is performed such that the required network bandwidth becomes equal to or narrower than the allocated network bandwidth, where the required network bandwidth corresponding to a predetermined transmission speed provided by the facsimile control signal received from the partner terminal unit in the packet network on the transmitting side is wider than the allocated network bandwidth, by transmitting a dummy training failure signal to the partner terminal unit on the transmitting side in response to a modem training signal received from the partner terminal unit in the packet network on the transmitting side, until the required network bandwidth corresponding to a transmission speed provided by the facsimile control signal that will be retransmitted from the partner terminal unit on the transmitting side becomes equal to or narrower than the allocated network bandwidth.

18. A communication system that realizes a real-time facsimile communication between a facsimile apparatus on a PSTN and a partner terminal unit on a packet network, the gateway unit comprising:
   a communication controller configured to adjust required network bandwidth corresponding to a transmission speed set up between the facsimile apparatus and the partner terminal unit to become equal to or narrower than the allocated network bandwidth,
   wherein the communication controller adjusts the required network bandwidth by demanding a reassignment of network bandwidth of the gatekeeper unit against the allocated network bandwidth where the required network bandwidth corresponding to a predetermined transmission speed provided by the facsimile control signal received from the partner terminal unit in the packet network on the receiving side, or from the facsimile apparatus in the PSTN on the receiving side is wider than the allocated network bandwidth allocated by the gatekeeper unit at starting the communication.

* * * * *